US010690066B2

(12) United States Patent
Dudar et al.

(10) Patent No.: US 10,690,066 B2
(45) Date of Patent: Jun. 23, 2020

(54) METHOD AND SYSTEM FOR PRESSURIZATION OF DEPRESSURIZED OBJECTS

(71) Applicant: Ford Global Technologies, LLC, Dearborn, MI (US)

(72) Inventors: Aed M. Dudar, Canton, MI (US); Mahmoud Yousef Ghannam, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/695,217

(22) Filed: Sep. 5, 2017

(65) Prior Publication Data

US 2019/0070907 A1 Mar. 7, 2019

(51) Int. Cl.
| | |
|---|---|
| *F02D 41/00* | (2006.01) |
| *B60C 29/06* | (2006.01) |
| *B60C 23/14* | (2006.01) |
| *A63B 41/12* | (2006.01) |
| *F02B 37/12* | (2006.01) |
| *B60C 23/00* | (2006.01) |
| *F02B 39/10* | (2006.01) |

(52) U.S. Cl.
CPC .......... *F02D 41/0007* (2013.01); *A63B 41/12* (2013.01); *B60C 23/003* (2013.01); *B60C 23/14* (2013.01); *B60C 29/064* (2013.01); *F02B 37/12* (2013.01); *F02B 39/10* (2013.01)

(58) Field of Classification Search
CPC ............................ F02D 41/0007; F02B 37/12
USPC .................. 123/559.1, 565; 60/598
See application file for complete search history.

(56) References Cited

U.S. PATENT DOCUMENTS

| | | | |
|---|---|---|---|
| 2,156,841 A | 5/1939 | Davis | |
| 5,906,480 A * | 5/1999 | Sabelstrom | ............. B60R 16/08 417/364 |
| 6,296,010 B1 | 10/2001 | DeLauer | |
| 6,445,287 B1 * | 9/2002 | Schofield | ............ B60C 23/0401 340/442 |

(Continued)

FOREIGN PATENT DOCUMENTS

| | | |
|---|---|---|
| CN | 2260016 Y | 8/1997 |
| CN | 202163251 U | 3/2012 |
| CN | 203344665 U | 12/2013 |

OTHER PUBLICATIONS

Breneman, M., "Method and System for Vehicle Tire Inflation," U.S. Appl. No. 15/440,965, filed Feb. 23, 2017, 64 pages.

(Continued)

*Primary Examiner* — Erick R Solis
*Assistant Examiner* — Robert A Werner
(74) *Attorney, Agent, or Firm* — Geoffrey Brumbaugh; McCoy Russell LLP

(57) ABSTRACT

Methods and systems are provided for using a forced induction system of an engine on-board a vehicle as a source of compressed air to pressurize depressurized objects on-board and external to the vehicle. In one example, a method may include, in response to a pressure of the depressurized object being below a threshold pressure while the engine is off, fluidly coupling a discharge of a forced induction system to the depressurized object, wherein the engine includes the forced induction system, and pressurizing the depressurized object by supplying electrical power to the forced induction system.

19 Claims, 9 Drawing Sheets

(56) References Cited

U.S. PATENT DOCUMENTS

| | | | | |
|---|---|---|---|---|
| 6,688,104 B2* | 2/2004 | Baeuerle | ............ | F02D 13/0261 |
| | | | | 123/198 D |
| 6,711,492 B1 | 3/2004 | Pursifull et al. | | |
| 7,040,304 B2* | 5/2006 | Kassner | ............ | F02D 41/0007 |
| | | | | 123/179.18 |
| 7,555,903 B2* | 7/2009 | Tarasinski | ............ | B60C 23/003 |
| | | | | 152/415 |
| 8,033,272 B2* | 10/2011 | Morizane | ............ | F02B 37/04 |
| | | | | 123/565 |
| 2002/0121323 A1* | 9/2002 | Tarasinski | ............ | B60C 23/003 |
| | | | | 152/416 |
| 2014/0191859 A1 | 7/2014 | Koelsch | | |
| 2017/0002761 A1 | 1/2017 | Dudar | | |

OTHER PUBLICATIONS

Davies, A., "A Little Fan That Fixes the Turbocharger'S Biggest Problem," Wired website, Available online at https://www.wired.com/2017/04/little-fan-fixes-turbochargers-biggest-problem/, Apr. 28, 2017, 7 pages.

* cited by examiner

METHOD AND SYSTEM FOR PRESSURIZATION OF DEPRESSURIZED OBJECTS

FIELD

The present description relates generally to methods and systems for using a forced induction system on-board a vehicle engine to pressurize depressurized objects.

BACKGROUND/SUMMARY

Flat tires can be inconvenient for vehicle drivers. Though some flat tire conditions, such as blow-outs or large punctures, immediately render tires unusable and in need of replacement, many flat tire conditions result in a slow leak and a source of pressurized air to reinflate the depressurized tires may be used to remedy the slow leaks until more long-term servicing is available. While some aftermarket systems provide for portable pressurized canisters for addressing a tire leak, such systems can degrade over storage time, and with inactivity, such that they are ineffective and thus offer reduced utility.

In one approach shown by Chinese Patent CN2260016Y, the compressed air generated by a cylinder of an engine is used to inflate a tire. A mixed gas shut-off valve is provided to allow for pure air inlet into a cylinder, and a spark plug of the cylinder is replaced with a hose coupling the cylinder to a tire. Engine operation is used to direct compressed air from the cylinder to the tire.

The inventors herein have recognized the above noted, as well as additional issues with such systems. As one example with respect to CN2260016Y, a typical user may not have the ability to remove a spark plug from an engine and successfully reinstall the inflator hose without introducing contamination into the engine system. Further, a hose sufficiently long to reach between the engine compartment and all vehicle tires may be prohibitively long and susceptible to damage during use, rendering it useless. As another example, a reciprocating air pump comprising a plurality of moving components and valves may be costly and prone to degradation due to extremely intermittent use. In yet another example, use of an engine-driven compressor and reservoir may decrease engine output while adding weight and cost to a vehicle system. As noted above, relying on a pressurized canister requires the user to have a functioning canister on hand. Further, in the case where the pressurized canister includes sealant, the sealant may become ineffective if stored for a duration longer than manufacturer recommendations, and the messy residue left by the sealant may require prompt and professional repair of the tire and may damage tire pressure sensors.

In one example, the issues described above may be at least partially addressed by a method for pressurizing a depressurized object with an engine of a vehicle system, comprising in response to a pressure of the depressurized object being below a threshold pressure while the engine is off, fluidly coupling a discharge of a forced induction system to the depressurized object, wherein the engine includes the forced induction system, and pressurizing the depressurized object by supplying electrical power to the forced induction system. As one example, in this way, a reliable source of compressed air can be provided on-board a vehicle in case of an emergency or non-emergency situation, without requiring heavy and costly air pumps, and without affecting driving performance. As an example, responsive to an indication of a depressurized object having a pressure below a threshold pressure while the engine is off, the depressurized object may be fluidly coupled to a discharge of the forced induction system. Furthermore, a controller on board the vehicle system may supply power to the forced induction from an energy storage device on board the vehicle system to raise a pressure of the depressurized object to the threshold pressure. Additionally or alternately to the controller automatically raising the pressure of the depressurized object to the threshold pressure, in some examples, a vehicle operator may manually control pressurization of the depressurized object to the threshold pressure.

In this way, an existing forced induction system of a vehicle system may be advantageously repurposed as a source of compressed air or a pressurization system for pressurizing various depressurized objects, including depressurized tires and other objects as described herein, while the engine is off. Furthermore, the methods and systems described herein preclude dedicated air pumps for tire inflation and/or pressure vessels for storing compressed air utilized by conventional tire inflation methods and emergency kits, thereby reducing cost and component complexity of the vehicle system while achieving a simple, low-cost, and reliable solution for inflating tires and other depressurized objects. Further still, weight of the vehicle system can be reduced while preserving cargo space since additional components such as pumps and pressure vessels are avoided. Further still, by performing the pressurization of the depressurized object while the engine is off, vehicle emissions and fuel consumption may be reduced, while maintaining vehicle performance. Further still, by repurposing an electrically-driven forced induction system fluidly coupled to the engine air intake the on-time duty cycle of the electrically-driven forced induction system can be increased. Further still, the electrically-driven forced induction system may be automatically or manually controlled to pressurize depressurized objects, thereby increasing flexibility of the pressurization relative to conventional systems and methods by allowing for operator-directed pressurization rates and operator-selected pressurization target pressures.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
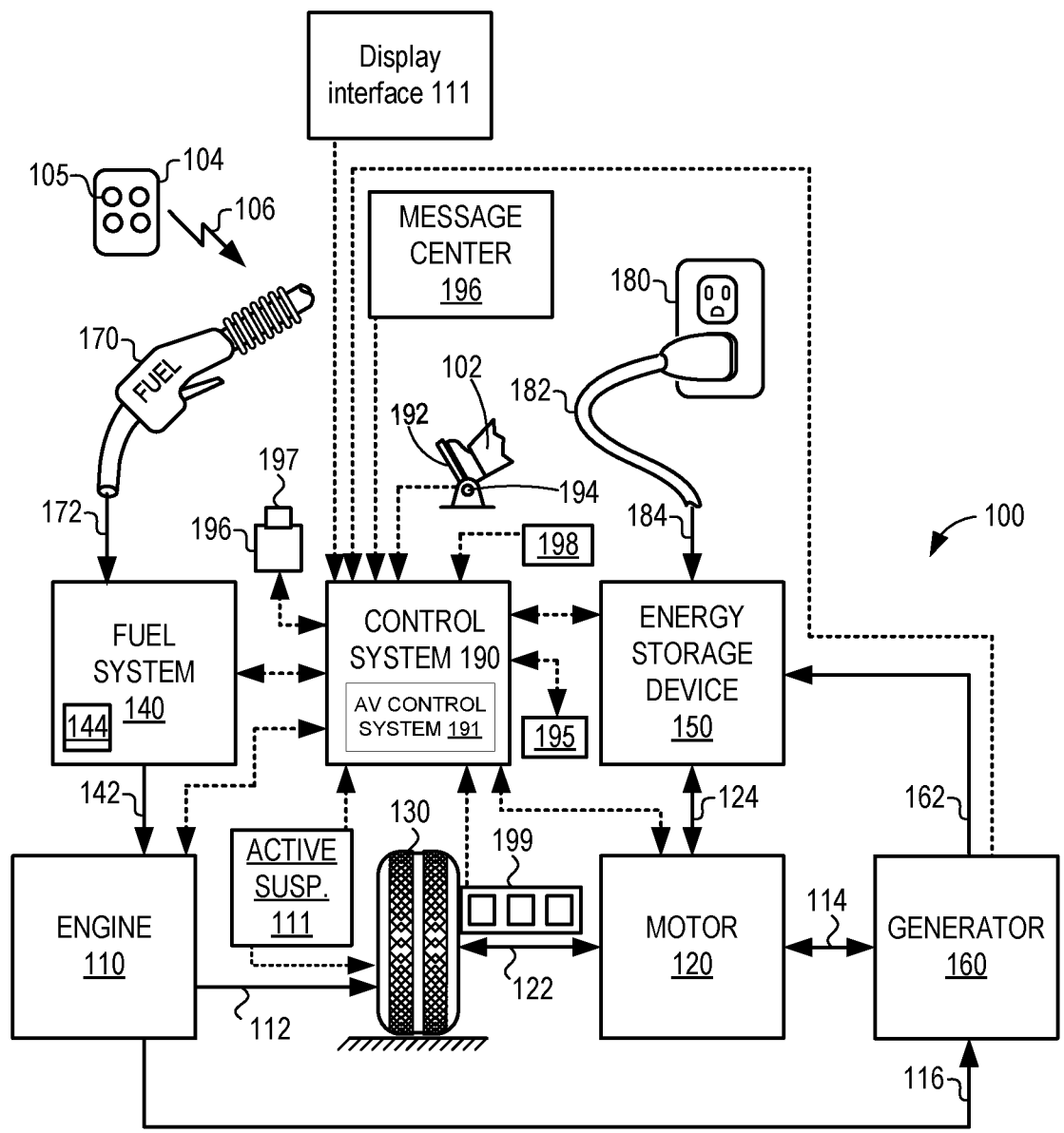
FIG. 1 schematically shows an example embodiment of a vehicle system.
Figure 4:
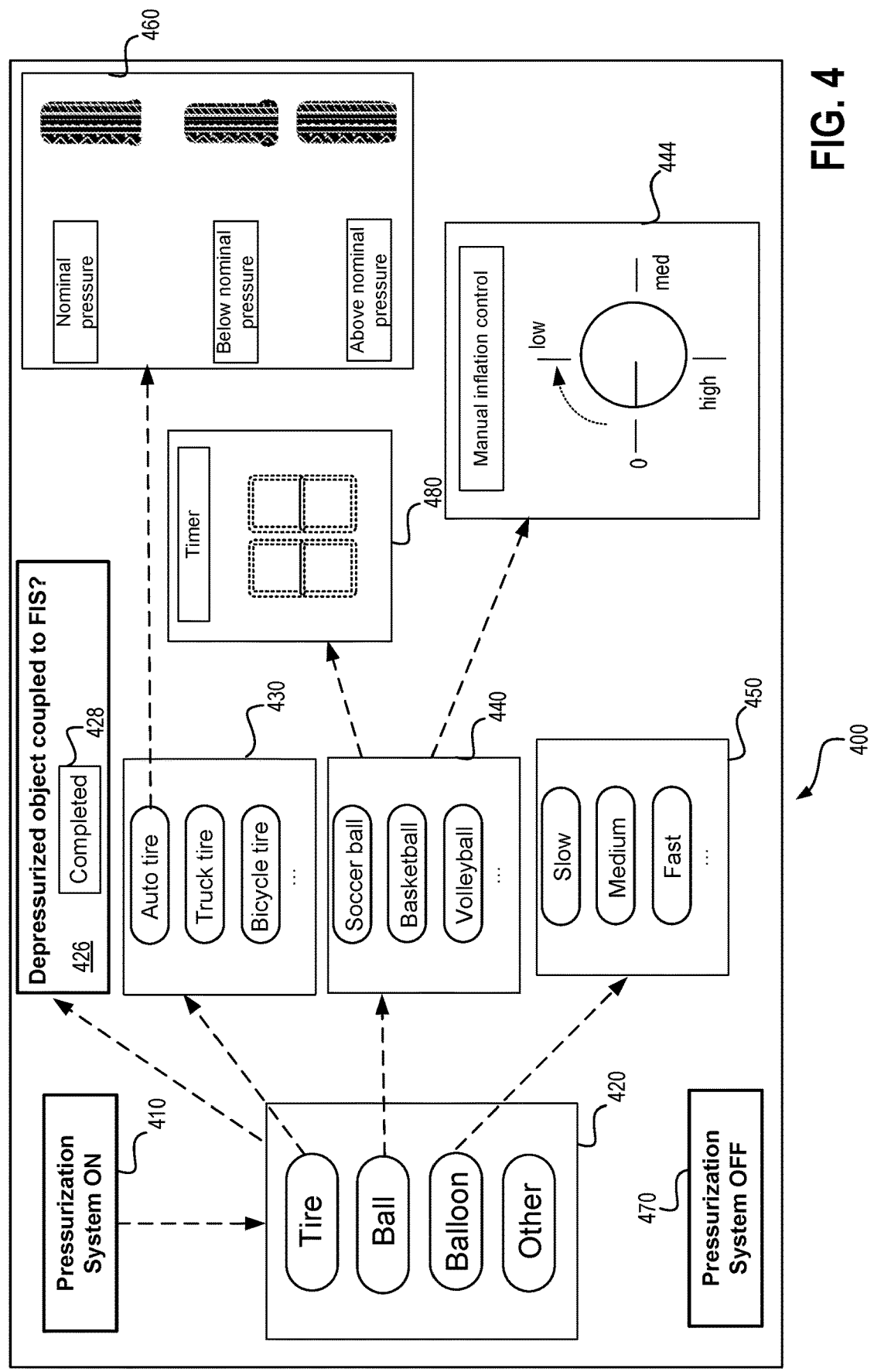
FIG. 4 shows a schematic of an operator interface for pressurization of a depressurized object according to the method of FIGS. 7-8.
Figure 5:
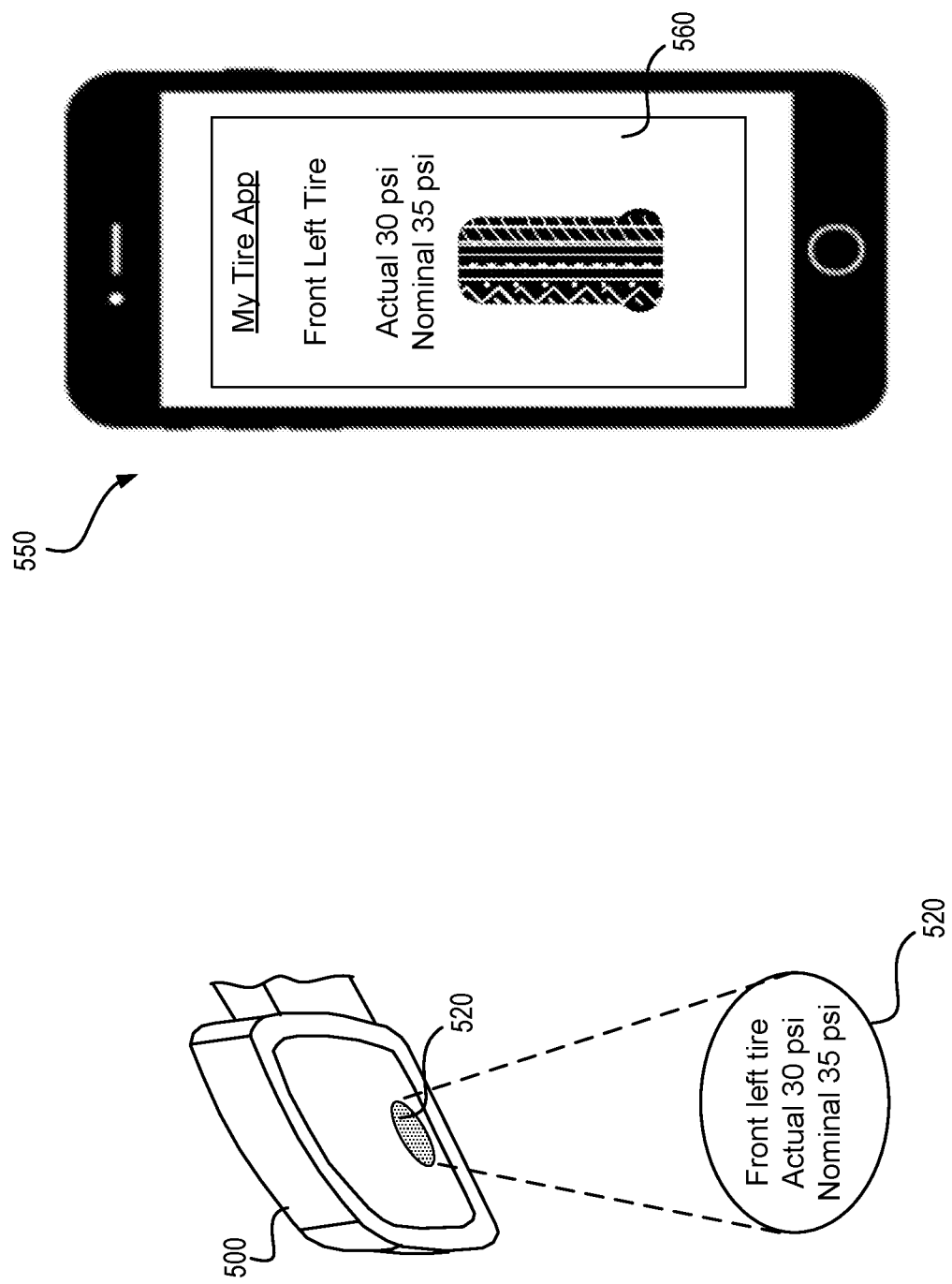
FIG. 5 illustrates example systems for displaying pressurization data of the depressurized object to an operator at a side mirror of the vehicle system of FIG. 1 and at a mobile wireless device.
Figure 7:
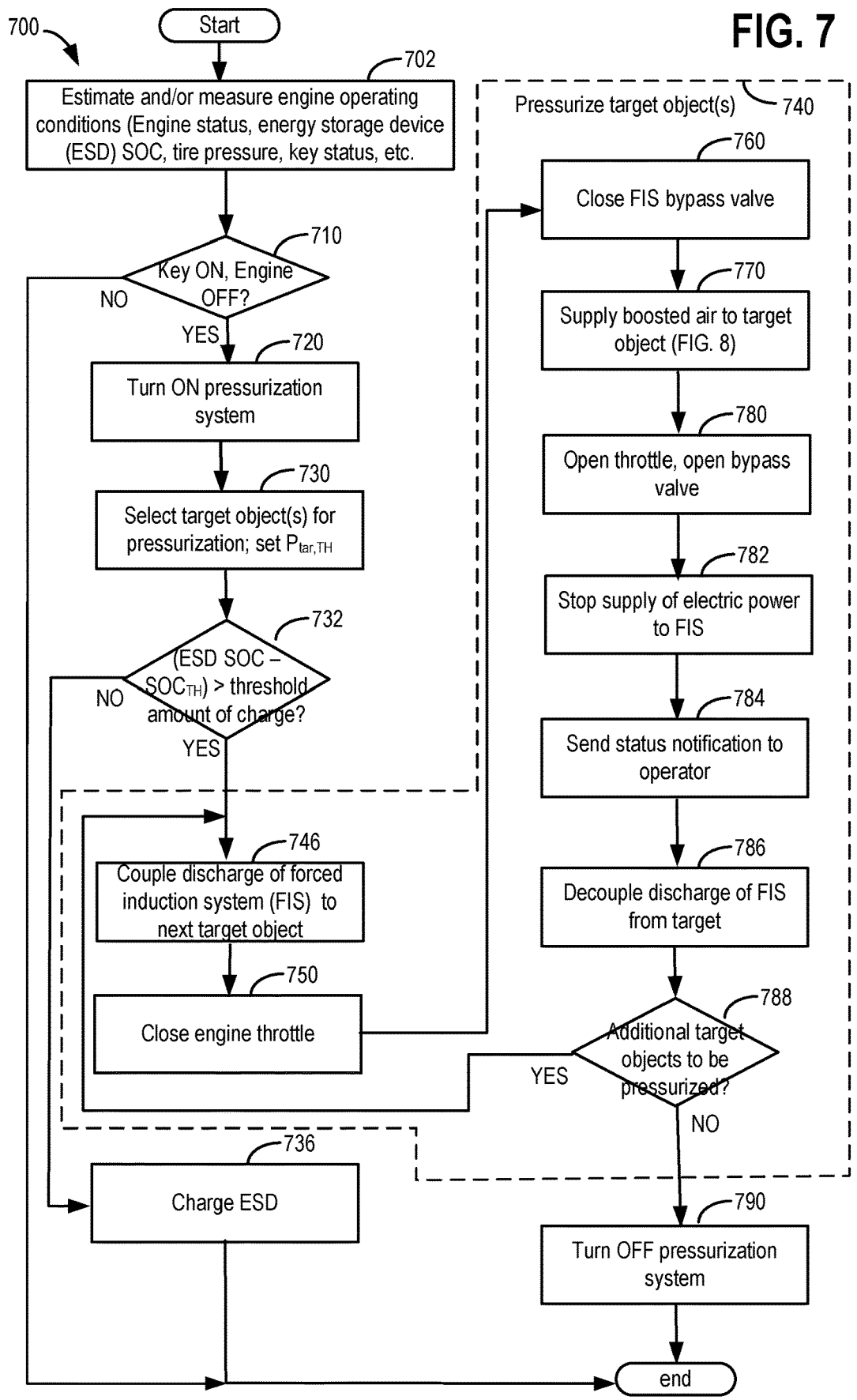
FIGS. 7-8 show flowcharts illustrating a method for the vehicle system of FIG. 1 of pressurizing a depressurized object.
Figure 8:
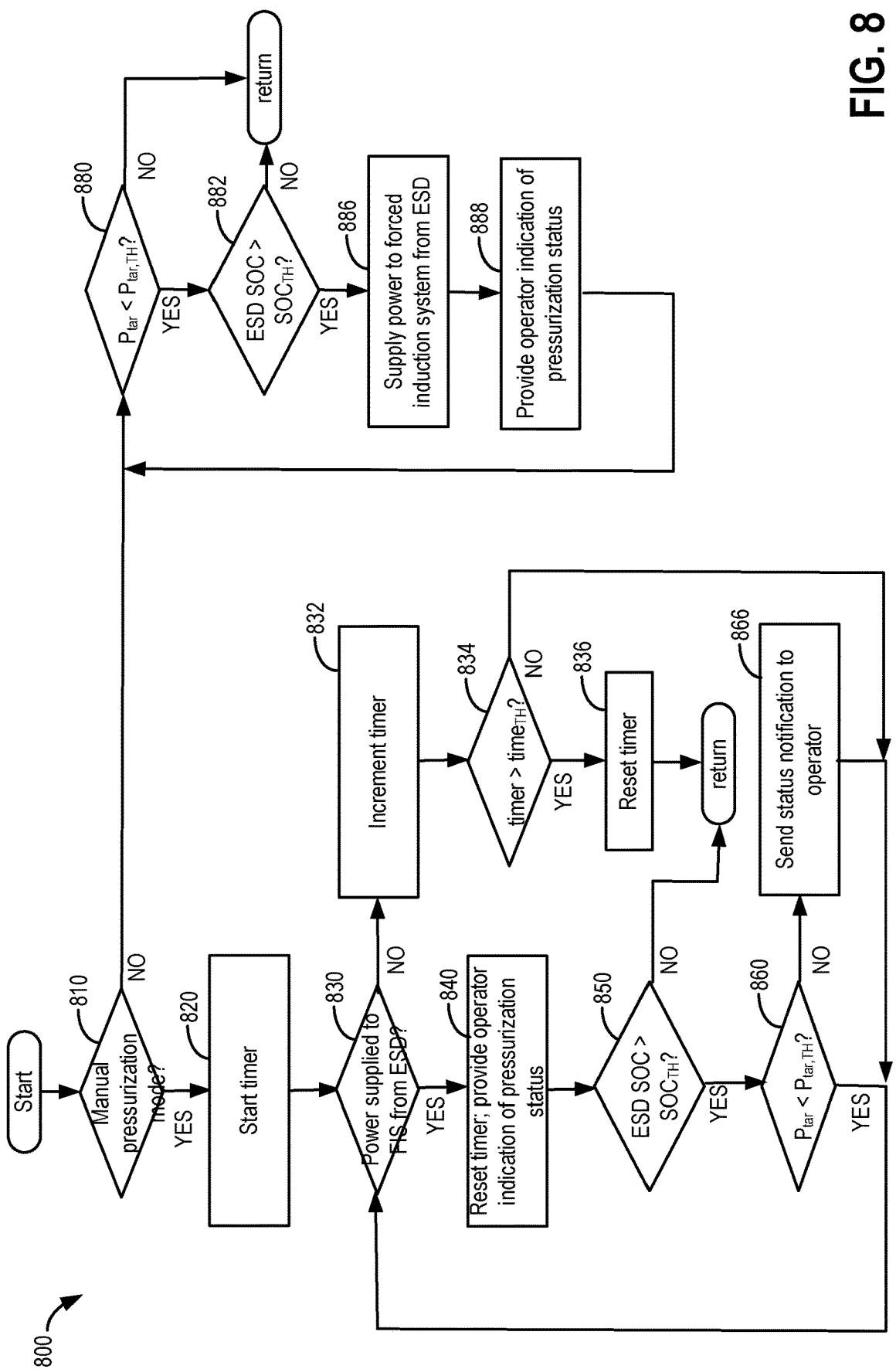
Figure 9:
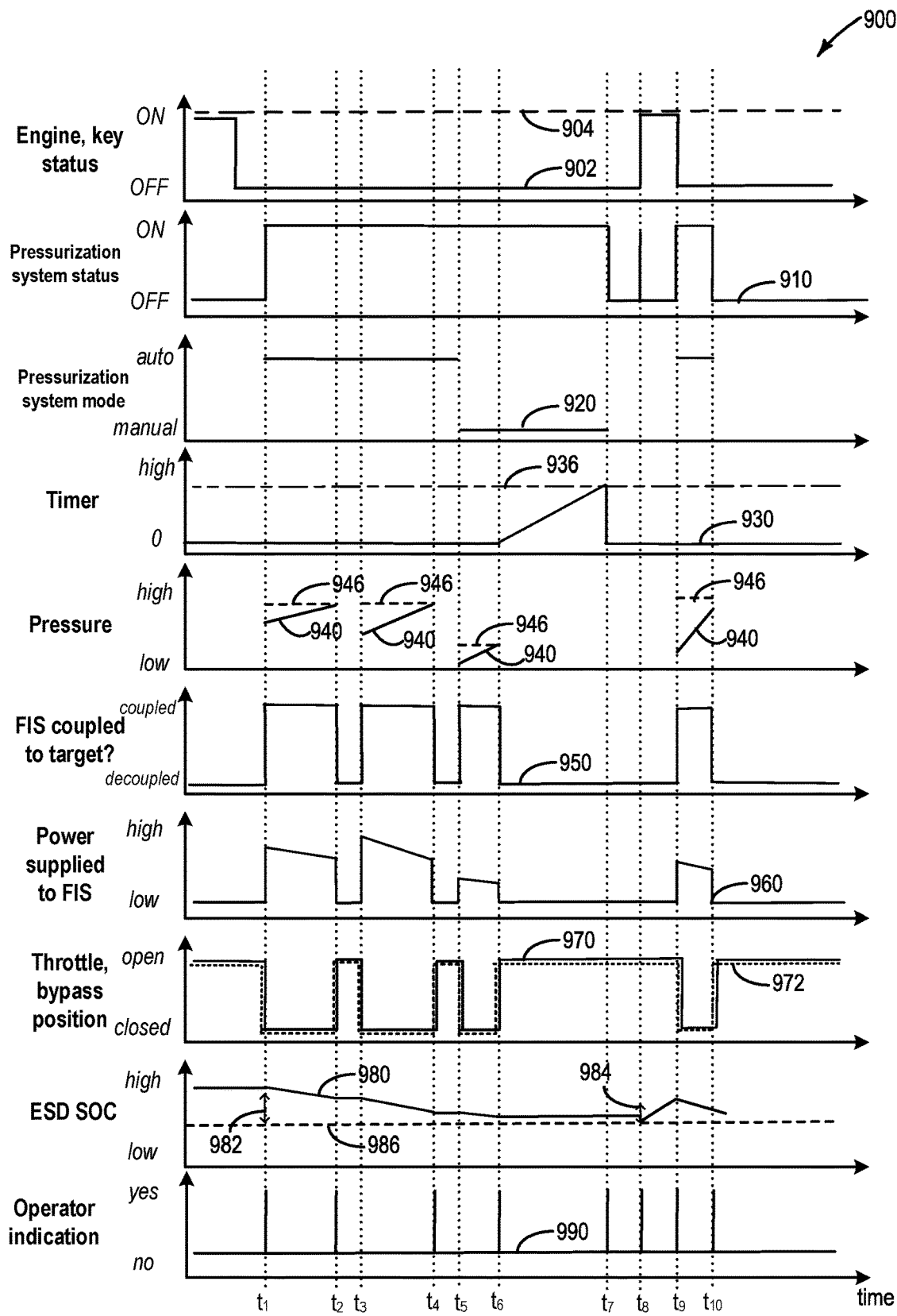
FIG. 9 shows an example timeline illustrating operation of the vehicle system of FIG. 1 for pressurizing a depressurized object according to the method of FIGS. 7-8.

The following description relates to systems and methods for a vehicle, such as the vehicle system of FIG. 1. The vehicle system comprises an engine having forced induction capabilities, such as the boosted engine system of FIG. 2 having an at least partially electrically-driven forced induction system. During engine off conditions, the discharge of the forced induction system may be fluidly coupled to a depressurized object by way of a coupling device illustrated in FIG. 3. Pressurization of the depressurized object may be directed by way of an electronic display interface of the vehicle system, as shown in FIG. 4. The display interface may include display of data at one or more devices on-board or external to the vehicle system of FIG. 1, as shown in FIG. 5. Methods for carrying out pressurization of the depressurized object may be manually and/or automatically controlled by the operator and/or a vehicle system controller, as shown in FIGS. 7-8. A timeline showing operation of the vehicle system according to the methods of FIGS. 7-8 for pressurization of a depressurized object is shown in FIG. 9. In this way, compressed air may be provided on-board a vehicle during engine off conditions for pressurization of a depressurized object.

Turning now to FIG. 1, it illustrates an example vehicle system 100. Vehicle system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle system 100 may utilize a variety of different operational modes depending on operating conditions encountered by the vehicle propulsion system. Some of these modes may enable engine 110 to be maintained in an off state (e.g., set to a deactivated state) where combustion of fuel at the engine is discontinued. For example, under select operating conditions, motor 120 may propel the vehicle via drive wheel 130 as indicated by arrow 122 while engine 110 is deactivated.

Figure 6:
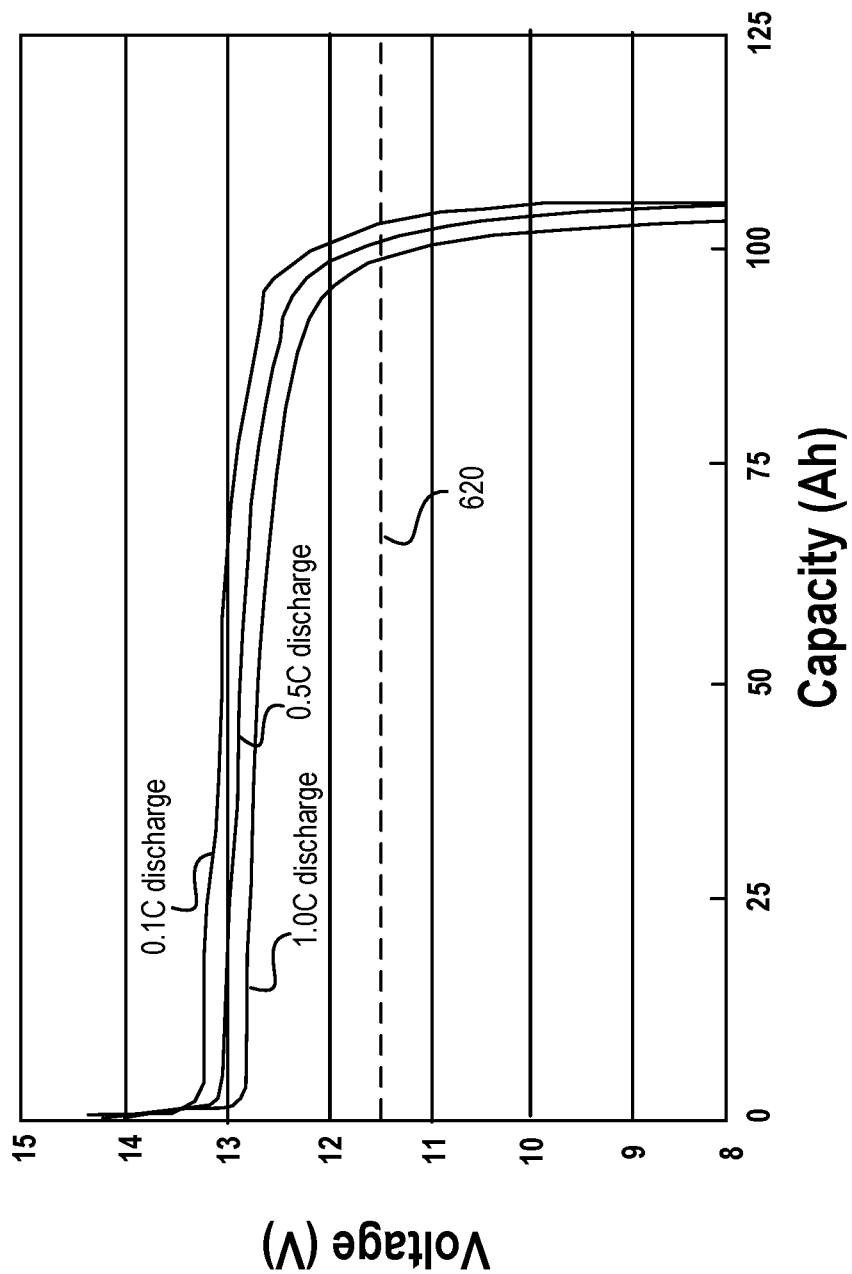
FIG. 6 illustrates a plot of a discharge curve for an energy storage device on-board the vehicle system of FIG. 1

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162. Charging and discharging of the energy storage device may be according to a discharge profile, as illustrated in FIG. 6, and further described below.

During still other operating conditions, engine 110 may be operated by combusting fuel received from fuel system 340 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 340 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 340, energy storage device 150, and generator 160. For example, control system 190 may receive sensory feedback information from one or more of engine 110, motor 120, fuel system 340, energy storage device 150, and generator 160. Further, control system 190 may send control signals to one or more of engine 110, motor 120, fuel system 340, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal. Furthermore, in some examples control system 190 may be in communication with a remote engine start receiver 195 (or transceiver) that receives wireless signals 106 from a key fob 104 having a remote start button 105. In other examples (not shown), a remote engine start may be initiated via a cellular telephone, or smartphone based system where a user's cellular telephone sends data to a server and the server communicates with the vehicle to start the engine. The presence of the key fob 104 and/or detection of devices by control system 190 that authorize a remote engine start may indicate a key on status of the vehicle system 100. Detection of the presence of key fob 104 and/or wireless devices that authorize a remote engine start may be predetermined or preset and pre-authenticated by the vehicle operator. Responsive to the absence of the key fob 104 and/or non-detection of wireless devices capable of authorizing a remote engine start, the controller may deauthenticate the key on status thereby switching the key status to key off.

In the case of an autonomous vehicle (AV), operator 102 may be substituted prior to the start of or enroute during a specified tip, by an autonomous vehicle control system 191, included within control system 190. In other words, the AV control system may provide indications and or requested output of the vehicle system 100 to the control system 190. Control system 190, in accordance with the AV control system requests, then actuates various vehicle actuators to propel the vehicle. In the case of an AV, the vehicle system 100 may include various devices for detecting vehicle surroundings, such as radar, laser light, GPS, odometry, and computer vision sensors. Advanced control systems, as part of the AV control system, may interpret sensory information to identify appropriate navigation paths, as well as obstacles and relevant signage (e.g., speed limits, traffic signals, and the like). The AV control system may further include executable instructions that are capable of analyzing sensory data to distinguish between different vehicles on the road, which can aid in planning a path to the desired destination. For example, the AV control system may include executable instructions to detect a type of roadway (e.g., one-way street, freeway, divided highway, and the like), or an available parking space (e.g., an empty space with enough clearance for the vehicle that is not prohibited based on time of day or loading zone, and the like). Furthermore, the AV control system 191 may include executable instructions to, in combination with sensory feedback, park a vehicle in a designated or detected available parking space.

Energy storage device 150 may periodically receive electrical energy from a power source 180 residing external to the vehicle (e.g., not part of the vehicle) as indicated by arrow 184. As a non-limiting example, vehicle system 100 may be configured as a plug-in hybrid electric vehicle (PHEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle system 100 may also include an ambient temperature/humidity sensor 198, and an active suspension system 111 that enables the control system 190 to regulate vertical positioning of the vehicle wheels 130 relative to the vehicle body. Active suspension system may comprise an active suspension system having hydraulic, electrical, and/or mechanical devices, as well as active suspension systems that control the vehicle height on an individual corner basis (e.g., four corner independently controlled vehicle heights), on an axle-by-axle basis (e.g., front axle and rear axle vehicle heights), or a single vehicle height for the entire vehicle. Vehicle system 100 may also include inertial sensors 199. Inertial sensors may comprise one or more of the following: longitudinal, latitudinal, vertical, yaw, roll, and pitch sensors. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed.

In an alternative embodiment, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

Vehicle system 100 may include display interface 113 for enabling operator input (e.g., a keyboard, a touch screen) and conveying instructions and messages to the operator. In one example, the display interface 113 may include a display device communicatively coupled by way of wired and/or wireless communication to the controller 12. For example, during engine off conditions, the operator may direct the vehicle system to pressurize a depressurized object fluidly coupled to the discharge of the forced induction system 211 by way of a human machine interface (HMI). The depressurized object may include an object with an internal pressure below a predetermined target threshold pressure. Accordingly, pressurizing the depressurized object may refer to raising the internal pressure of the depressurized object, for example, raising the internal pressure of the depressurized object to a target threshold pressure. In some implementations, the target threshold pressure may correspond to a nominal pressure, above a nominal pressure, or below a nominal pressure. For an inflatable depressurized object, such as a tire, balloon, or ball, pressurizing the depressurized object can include changing a shape and/or volume of the depressurized object. For the case of a rigid, non-inflatable object, pressurizing the depressurized object can include raising the internal pressure of the depressurized object without changing a shape and/or volume of the depressurized object. An example HMI is illustrated and described below with respect to FIG. 4. Furthermore data associated with the pressurization such as the instantaneous pressure of the depressurized object may be displayed via the display interface 113 and/or instrument panel 196, as shown in FIG. 5. In some examples, the pressurization of the depressurized object may be executed automatically by the control system 190, such that the control system responsively stops supply of electrical power to the forced induction system 213, thereby halting pressurization of the depressurized object, responsively to one or more conditions being met.

The one or more conditions for halting the pressurization may include the pressure of the depressurized object increasing above a threshold pressure and/or the state of charge of an energy storage device 150 supplying electric power to the forced induction system 211 decreasing below a threshold state of charge. In other examples, the pressurization of the depressurized object may be executed manually by the operator by way of the display interface 113, such that the operator monitors the instantaneous pressure of the depressurized object and stops supply of electric power to the forced induction system 211 upon reaching a threshold pressure. In yet other examples, the pressurization may be executed automatically by the controller 12, but the operator may manually abort or manually halt the pressurization. Furthermore, the controller 12 may prompt the operator by way of the display interface 113 to manually fluidly couple and decouple the discharge of the forced induction system 211 to the depressurized object prior to a start and after completion of the pressurization.

The nominal pressure for a depressurized object may correspond to a nominal pressure for the depressurized object at standard ambient temperature (e.g., room temperature). Accordingly, when an actual temperature of the depressurized object or when the actual ambient temperature deviates from the standard ambient temperature, in cases where the threshold pressure is selected equivalent to a nominal pressure, the threshold pressure may be adjusted (e.g., normalized) to correspond to an adjusted nominal pressure at the actual temperature by the controller 12. The calculation of the adjusted threshold pressure to the may be calculated according to various thermodynamic relationships and gas laws. In one example, the normalization of the threshold pressure may be simplified by assuming that the volume of the depressurized object is constant during pressurization and that the air inside the depressurized object obeys the ideal gas law given by equation (1):

$$PV = mRT; \quad (1)$$

where V is the volume of the depressurized object, P is the internal pressure of the depressurized object, R is the ideal gas constant, T is the temperature of the air inside the depressurized object, and m is the number of moles of gas in the depressurized object. Thus, at standard ambient conditions, (indicated by subscript 1):

$$P_1 V_1 = mRT_1; \quad (2)$$

where $P_1$ is the nominal pressure at standard ambient temperature. Similarly, at non-standard conditions, (indicated by subscript 2), $$P_2 V_2 = mRT_2; \quad (3)$$

where $P_2$ is the normalized nominal pressure at the non-standard temperature, $T_2$. Dividing equation (3) by equation (2) yields:

$$\frac{P_2 V_2}{P_1 V_1} = \frac{mRT_2}{mRT_1}; \quad (4)$$

where $V_2 = V_1$, since volume is assumed constant. Thus, equation (4) can be simplified, and the normalized pressure can be determined by:

$$P_2 = P_1 \frac{T_2}{T_1}; \quad (5)$$

In other words, when the actual temperature is greater than the standard ambient temperature (e.g., $T_2/T_1 > 1$), the normalized pressure will be greater than the nominal pressure at standard ambient conditions, while when the actual temperature is less than the standard ambient temperature (e.g., $T_2/T_1 < 1$), the normalized pressure will be less than the nominal pressure at standard ambient conditions. The calculation of $P_2$, maybe continuously calculated and adjusted during pressurization of the depressurized object because the temperature of the air in the depressurized object may change as the object is pressurized due to the increasing pressure inside the object, fluctuating ambient temperatures, and fluctuating temperatures of the boosted air delivered to the depressurized object. In other examples, the normalized pressure may be calculated with non-ideal gas law relationships such as van der Waals equation, Redlich-Kwong model, and the like.

In one example, the vehicle control system 190 may be coupled to a network such as a cloud-based network. In addition, the vehicle may be coupled to a remote server and the controller of one or more other vehicles. Additionally, the vehicle control system 190 may be coupled to a mobile device of the operator via cloud-based communication and so messages pertaining to engine operation or vehicle system status may be communicated to the driver though the operator's mobile device. For example, monitoring of the pressurization of the depressurized object may be conducted at a mobile device such as a cellular phone app, as further described with reference to FIG. 5.

Figure 2:
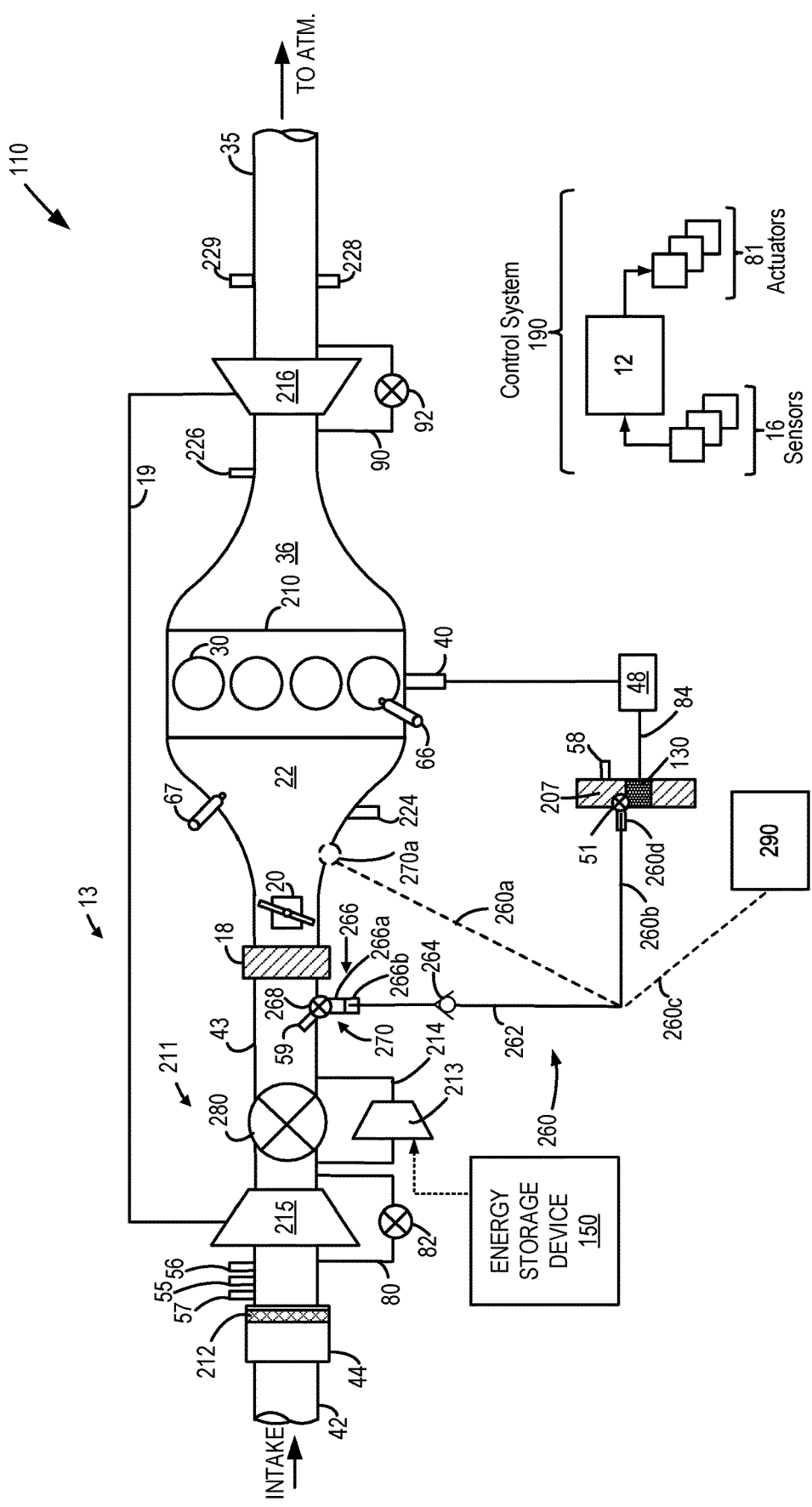
FIG. 2 shows an example embodiment of an engine system on-board the vehicle system of FIG. 1 having a forced induction system coupled to an air intake of the vehicle engine.

FIG. 2 schematically shows aspects of the example engine system 110 of the vehicle system 100 of FIG. 1. Engine system 110 may be included in a vehicle propulsion system such as in an on-road vehicle system 100. In one example, the on-road vehicle is a hybrid electric vehicle. In the depicted embodiment, the engine system includes an internal combustion engine 210, which is coupled to a forced induction system 211 including one or more boosting devices. In the depicted example, the boosting devices include a turbocharger 13 and an electrically driven booster (ebooster) 213. In other examples, the boosting device may include the ebooster 213. Turbocharger 13 comprises a turbine 216 positioned in the exhaust passage 35 coupled to a compressor 215 via a shaft 19. Compressor 215 is positioned in the intake passage 42 upstream of a charge air cooler 18 (also referred to herein as CAC) and a throttle 20. In the example of FIG. 2 ebooster 213 is positioned downstream from the compressor 215, however in other example engine systems, ebooster 213 may be positioned upstream from the compressor 215.

Engine 210 receives air along intake passage 42 via an air box 44 including air cleaner 212. The air is compressed by the one or more boosting devices (e.g., compressor 215 and ebooster 213) and the boosted (e.g., compressed) air is delivered to induction passage 43. The compressed air passes through the induction passage 43, through the CAC 18 to cool, and through the throttle 20 before entering the induction manifold 22 where it enters the engine 210. In other words, compressor 215 and the ebooster 213 are coupled through charge air cooler 18 to intake throttle 20 and intake throttle 20 is coupled upstream of induction manifold 22. The charge-air cooler may be an air-to-air or water-to-air heat exchanger, for example. In the embodiment shown in FIG. 2, the pressure of the air charge within the induction manifold 22 is sensed by a manifold air pressure (MAP) sensor 224.

Turbocharger 13 includes compressor 215 mechanically coupled to turbine 216 via shaft 19, the turbine 216 driven by expanding engine exhaust. However, other combinations and configurations of boosting devices may be possible. In one embodiment, the turbocharger may be a twin scroll device. In another embodiment, the turbocharger 13 may be a variable geometry turbocharger (VGT), where turbine geometry is actively varied as a function of engine operating conditions. In yet another embodiment, engine system 110 may comprise a supercharger or both a supercharger and turbocharger. For an embodiment that includes a supercharger, compressor 215 may be at least partially driven by an electric machine and/or the engine 210, and may not include turbine 216. In the case where compressor 215 may be at least partially electrically-driven, supplying electrical power to compressor 215 during key on and engine off conditions may enable the compressor 215 to supply boosted air to a depressurized object fluidly coupled to the discharge of the FIS 211. Supplying electrical power to compressor 215 during engine off and key on conditions may include supplying electrical power to compressor 215 by way of an ESD 150 on board the vehicle or from an external power source 180, such as when a PHEV is plugged into a power grid.

In some examples, compressor 215 may include a compressor recirculation valve (CRV) 82 across compressor 215. The depicted example shows a recirculation passage 80 with CRV 82 for recirculating (warm) compressed air from the compressor outlet back to the compressor inlet. In some embodiments, the compressor recirculation system may alternatively, or additionally, include a recirculation passage for recirculating (cooled) compressed air from the compressor outlet, downstream of the charge air cooler to the compressor inlet or compressor bypass for dissipating compressed air to atmosphere. The CRV 82 may be a continu-ously variable valve wherein a position of the valve is continuously variable from a fully closed position to a fully open position. In some embodiments, compressor recirculation valve 82 may be normally partially open during boosted engine operation to provide some surge margin. Herein, the partially open position may be a default valve position. Increasing the opening of the compressor recirculation valve may include actuating (or energizing) a solenoid of the valve. Further discussion of example CRV operation will be discussed herein.

One or more sensors may be coupled to an inlet of the compressor 215 as shown in FIG. 2. For example, a temperature sensor 55 may be coupled to the inlet for estimating a compressor inlet temperature. As another example, a pressure sensor 56 may be coupled to the inlet of the compressor for estimating a pressure of air charge entering the compressor. Still other sensors may include, for example, air-fuel ratio sensors, humidity sensors, etc. In other examples, one or more of the compressor inlet conditions (such as humidity, temperature, etc.) may be inferred based on engine operating conditions. The sensors may estimate a condition of the intake air received at the compressor inlet from the intake passage as well as the air charge recirculated from upstream of the CAC. One or more sensors may also be coupled to intake passage 42, upstream of compressor 215, for determining a composition and condition of air charge entering the compressor. These sensors may include, for example, a manifold air flow sensor 57.

Ebooster 213 may positioned in series and fluidly coupled either upstream or downstream from the compressor 215 in air intake passage 42. During vehicle operation when the engine is on, the control system 190 may supply electrical power from an energy storage device 150 to the ebooster 213 for supplementing the intake air boost provided by the compressor 215 of the turbocharger 13. As an example, electrical power may be supplied to the ebooster 213 during engine on conditions during turbo lag conditions when the turbocharger response for boosting the intake air is slower than a torque demand. Turbo lag may arise due to the time elapsing for fuel and air to be combusted in the engine combustion chambers 30 and to flow through the exhaust passage 35 prior to driving turbine 216 and the compressor 215. Furthermore, additional time lag may arise due to the turbine 216 and/or compressor 215 spool-up to high enough speeds such that the compressor 215 may provide mechanically-driven boosting of the intake air at a high enough desired boost pressure. Accordingly, while the engine is on, electrical power may be supplied to the ebooster 213 during higher instantaneous torque demands (e.g. sudden acceleration, and the like) to deliver boosted air until the turbo lag elapses and the compressor 215 can provide boosted air to the engine 210. Once the turbo lag elapses, electrical power supplied to the ebooster 213 may be stopped while the engine is on, thereby preserving charge in the energy storage device 150.

In contrast to electrically assisted turbochargers, the ebooster 213 provides a second distinct boosting stage, as two turbo-machines connected in series. As such, the pressures of the two charging units are multiplied. By selectively matching the flow characteristics of the compressor 215 and the ebooster 213, a power curve of the forced induction system 211 may be expanded and more flexibly adapted to provide boosted air over a broader range of vehicle operating conditions. For example, the ebooster 213 may enable smaller and more efficient high-performance turbocharged engines to exhibit dynamic response to torque demands that matches that of a larger non-supercharged engine of the same output class. Furthermore, the thermomechanical stress on the electrical and electronic components of the engine system may be reduced as compared with forced induction systems comprising electrically-assisted turbochargers without an ebooster. The ebooster 213 may be positioned in a bypass passage 214, and may be operated by controller 12 in conjunction with bypass valve 280. For example, the controller 12 may close bypass valve 280 to divert air flow from the intake passage 42 through the bypass passage 214 and ebooster 213 while supplying electrical power to the ebooster 213. In contrast, the controller 12 may open bypass valve 280 to direct intake air flow to at least partially bypass ebooster 213. In some examples, the ebooster 213 may be powered by way of an ESD 150, such as from a 48 VDC battery.

As further described herein, the ebooster 213 may be utilized to inflate and/or pressurize depressurized objects, including vehicle tires 207 while the engine is off. For example, electrical power may be supplied to power the ebooster 213 from energy storage device 150 during a first condition including while the discharge of the ebooster 213 of the forced induction system 211 is fluidly coupled to the depressurized object and the engine is off. Furthermore, the first condition may further include the throttle 20 being closed to reduce boosted air from the discharge of the ebooster 213 from entering the induction manifold 22, and to increase boosted air flow to the pressurized device. Similarly, the first condition may further include closing bypass valve 280 to reduce boosted air from the discharge of the ebooster 213 from entering the induction manifold 22, and to increase boosted air flow to the pressurized device.

Induction manifold 22 is coupled to a series of combustion chambers 30 through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system 110.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as specified for desired combustion and emissions-control performance. Additionally, a variable cam timing device (not shown) may be actuated to adjust the timing of the intake and exhaust valves (not shown) to a timing that provides decreased positive intake to exhaust valve overlap. That is to say, the intake and exhaust valves will be open for a shorter duration and will move away from being simultaneously open for a portion of the intake stroke.

Combustion chambers 30 may be supplied one or more fuels, such as gasoline, alcohol fuel blends, diesel, biodiesel, compressed natural gas, etc. Fuel may be supplied to the combustion chambers via direct injection, port injection, throttle valve-body injection, or any combination thereof. Direct injection comprises injecting the fuel directly into the combustion chamber, and port injection delivers the fuel spray into the intake ports where it mixes with the intake air before entering the combustion chamber. The present example may include a plurality of direct fuel injectors 66 and port fuel injectors 67. In the combustion chambers, combustion may be initiated via spark ignition and/or compression ignition.

As shown in FIG. 2, exhaust from the one or more exhaust manifold sections is directed to turbine 216 to drive the turbine. When reduced turbine torque is desired, some exhaust may be directed instead through a waste-gate 90, bypassing the turbine 216. Waste-gate valve 92 may be actuated open to dump at least some exhaust pressure from upstream of the turbine 216 to a location downstream of the turbine via waste-gate 90. By reducing exhaust pressure upstream of the turbine 216, turbine speed can be reduced. In one embodiment, waste-gate valve 92 may be a vacuum actuated, that is, it may be actuated via the application of vacuum. The combined flow from the turbine 216 and the waste-gate 90 then flows through an emission control system (not shown) before all or part of the treated exhaust may be released into the atmosphere via exhaust passage 35. Depending on operating conditions, however, some exhaust may be diverted instead to the intake passage via an EGR passage (not shown) including an EGR cooler and an EGR valve. In one example, EGR may be recirculated to the inlet of compressor 215.

During conditions when there is a transient increase in driver torque demand, such as during a tip-in, when going from engine operation without boost to engine operation with boost, the throttle 20 opening may be increased to increase air flow to the engine. The opening of the waste-gate valve 92 may decreased to increase the flow of exhaust gas through the turbine 216, which increases the speed of the turbine. In one example, the waste-gate valve 92 may be completely closed. The increased speed of the turbine drives the compressor 215.

During conditions when there is a decrease in driver torque demand, such as during a tip-out, when going from engine operation with boost to engine operation without boost, or reduced boost, the throttle 20 opening may be decreased. In one example, the throttle 20 opening may be closed. In another example, the CRV 82 may be opened so that the higher speed of the turbine 216 does not overwhelm the compressor 215 and cause compressor surge. The waste-gate valve 92 is also opened to increase the flow of exhaust gas bypassing the turbine 216 and reduce turbine speed. This allows excess boost pressure to be substantially immediately relieved.

During conditions when engine 210 is idling and the vehicle is stopped, the intake throttle may be opened just enough to keep the engine running. In other examples, such as where the engine includes an idle control valve, the intake throttle may be fully closed while the idle control valve is opened so that sufficient air is delivered to the engine to keep the engine idling. As such, during engine idling conditions, the compressor 215 may not be spinning.

Engine torque from engine 210 may be transferred to a vehicle drive wheel 130 via a drivetrain including a powertrain shaft 84, tire 207, transmission 48, crankshaft 40, and wheel 130. Vehicle system 100 may have any number of wheels 130, including drive wheels and non-drive wheels. Specifically, engine torque may be relayed from a crankshaft 40 to a transmission 48, and thereon to the wheels 130. Transmission 48 may be a fixed ratio transmission including a plurality of gear ratios to allow engine 210 to rotate at a different speed than wheels 130. The wheels are coupled to inflatable tires 207 to provide shock absorption and provide a comfortable ride for the vehicle system 100 operator. Each tire may include a tire pressure sensor 58 for determining the internal air pressure of the tires, and a tire valve stem 51 for inflating and deflating tires. Tire pressure sensor 58 may wirelessly transmit data to control system 190. Transmission 48 may include an automatic transmission, wherein operating conditions determine transmission gear, or manual, wherein the operator selects transmission gear. A clutch (not shown) may be provided between engine crankshaft 40 and transmission 48. By changing a torque transfer capacity of the clutch (e.g., an amount of clutch slippage), an amount of engine torque relayed to the wheels via the powertrain shaft may be modulated.

Engine system 110 may further include control system 190. Control system 190 is shown receiving information from a plurality of sensors 16 (various examples of which are described herein) and sending control signals to a plurality of actuators 81 (various examples of which are described herein). As one example, sensors 16 may include MAP sensor 224, exhaust oxygen sensor, exhaust temperature sensor 228, exhaust pressure sensor 229, compressor inlet temperature sensor 55, compressor inlet pressure sensor 56, manifold air flow sensor 57, and pick-up valve sensor 59. Other sensors such as additional pressure, temperature, air/fuel ratio, and composition sensors may be coupled to various locations in engine system 110. The actuators 81 may include, for example, throttle 20, bypass valve 280, compressor recirculation valve 82, waste-gate valve 92, a pick-up valve 268, direct fuel injector 66, and port fuel injector 67.

The control system 190 may include the controller 12. The controller may receive input data from the various sensors, process the input data, and employ the various actuators based on the received signals and instructions stored on a memory of the controller. The controller 12 may employ the actuators 81 in response to the processed input data based on instruction or code programmed therein corresponding to one or more routines, such as example control routines described herein with regard to FIGS. 7-8. As one example, the controller may send a signal to an actuator of the waste-gate valve to increase or decrease the opening of the waste-gate valve to accordingly decrease or increase the rotation speed of the exhaust turbine driving the compressor of the turbocharger.

In addition to using the forced induction system 211 for providing a transient boost pressure, responsive to an operator input, the forced induction system 211, specifically ebooster 213, may be advantageously used to generate compressed air for pressurizing depressurized objects fluidly coupled to the discharge of the forced induction system 211 while the engine is off. Accordingly, the forced induction system 211 may provide a reliable, on-board source of compressed air for one of more vehicle components including components external to engine 210, and one or more non-vehicle depressurized components. For example, compressed air supplied from the ebooster 213 while the engine is off may be used for inflating tires 207 of wheels 130 through a tire inflation valve 109, for pressurizing air to an air suspension system of the vehicle, and for pressurizing objects external to the vehicle system such as bicycle tires, sports equipment (e.g., volleyballs, basketballs, soccer balls), balloons, and the like.

During the pressurization of depressurized objects fluidly coupled to the discharge of the forced induction system 211 while the engine is off, the controller 12 may adjust various engine actuators to increase boost pressure generated at the discharge of the forced induction system 211 without turning on the engine. In one example, increasing boost pressure at the discharge of the forced induction system 211 (e.g., discharge of the ebooster 213) may be achieved by reducing the opening of the bypass valve 280, thereby reducing the quantity of air bypassing the ebooster 213. In another example, increasing boost pressure in the discharge of the forced induction system 211 may be achieved by decreasing the opening of the throttle (e.g., decreasing the opening of the throttle plate) to restrict the amount of intake air that is permitted to flow to the induction manifold 22 and cylinders 30. In another example, increasing supply of electric power from energy storage device 150 to the ebooster 213 of forced induction system 211 may increase boost pressure at the discharge of the forced induction system 211. Furthermore, the amount that the controller 12 may reduce the opening of the bypass valve 280, reduce the opening of the throttle, and may increase supply of electric power to increase boost pressure at the discharge of the forced induction system 211 may be based on the threshold pressure for pressurizing the depressurized object. For example, the controller 12 may supply higher amounts of electrical power to the ebooster 213 when the threshold pressure is higher. Furthermore, the controller 12 may supply higher amounts of electrical power to the ebooster 213 when a difference between a pressure of the depressurized object and the threshold pressure is higher, thereby increasing a rate of pressurization. Further still the controller 12 may fully close the throttle 20 and may fully close bypass valve 280 to increase supply of intake air to the ebooster 213 and to reduce the flow of intake air bypassing ebooster 213, thereby reducing electrical power for the pressurization.

The discharge of the forced induction system 211 may be fluidly coupled to the depressurized object by way of a fluid coupling system 300 including a pick-up line 260 and a connection port 270. In one example, the connection port 270 may include pick-up valve 268, a pick-up valve sensor 59 and a first component 266a of a pneumatic coupling 266. In one example, connection port 270 may be coupled to the induction passage 43 downstream of the compressor 215 and ebooster 213, and upstream of the CAC 18. In other examples, the connection port may be located downstream of the CAC 18, as denoted by dashed circle 270a. Additionally, the pick-up line may be coupled to the connection port 270a downstream of the CAC 18, as shown by dashed line 260a. It will be appreciated that included subcomponents of the pick-up line 260 and the connection port 270 are not shown in the alternate embodiments 260a and 270a for simplicity.

The air pick-up line 260 may include a flexible hose 262 with a second component 266b of pneumatic coupling 266 coupled to a first end of the hose for fluidic coupling to the first component 266a. By coupling the first component 266a and the second component 266b of pneumatic coupling 266, the fluid coupling system 300 and the discharge of the forced induction system 211 may be fluidically connected by opening the pick-up valve 268. Pick-up valve 268 may be integrated into one or both of the first component 266a and the second component 266b. For example, in the case of a push-to quick-connect type fitting, where the first and second components correspond to a male and female portion, respectively, of the quick-connect type fitting, fluidically coupling the first component 266a and the second component 266b automatically opens the integrated pick-up valve 268. Conversely fluidically decoupling the first component 266a and the second component 266b automatically closes the integrated pick-up valve 268. A second end 260b of the flexible hose 262 may include a fitting or coupling for fluidically coupling the flexible hose 262 to the depressurized object. In one example, a coupling 260d compatible with a common (e.g., Schrader-type) valve design for inflating a vehicle tire, bicycle tire, and the like may be positioned at the second end 260b so that the flexible hose can be fluidically coupled to the vehicle tire, bicycle tires, and the like, respectively. In other embodiments, the fluid coupling system 300 may include additional second ends 260c (e.g., separate ends 260b adapted for various fluidic coupling designs that can be sealably and releasably coupled to a common flexible hose 262) for fluidic coupling to connection port 270 and for pressurizing other types of depressurized objects 290. Examples of depressurized objects 290 may include depressurized objects external to the vehicle system such as sporting equipment such as soccer balls, volleyballs, and basketballs; balloons; and the like. Further examples of depressurized objects 290 may include vehicle tires and components of other vehicle systems. In this way the pressurization systems and methods described herein of the vehicle system 100 may be utilized to pressurize tires (or other depressurized components) of another vehicle system. In the case of pressurizing sporting equipment, the second end 260c may include an air inflating needle valve adaptor.

The air pick-up line 260 may further include a check valve 264 for blocking back-flow of air and debris from the depressurized object back to the discharge of the forced induction system during pressurization. The check valve 264 may be integrated as part of a pressure regulator for regulating an amount or rate of boosted air delivered to the depressurized object during pressurization.

FIGS. 1-2 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Figure 3:
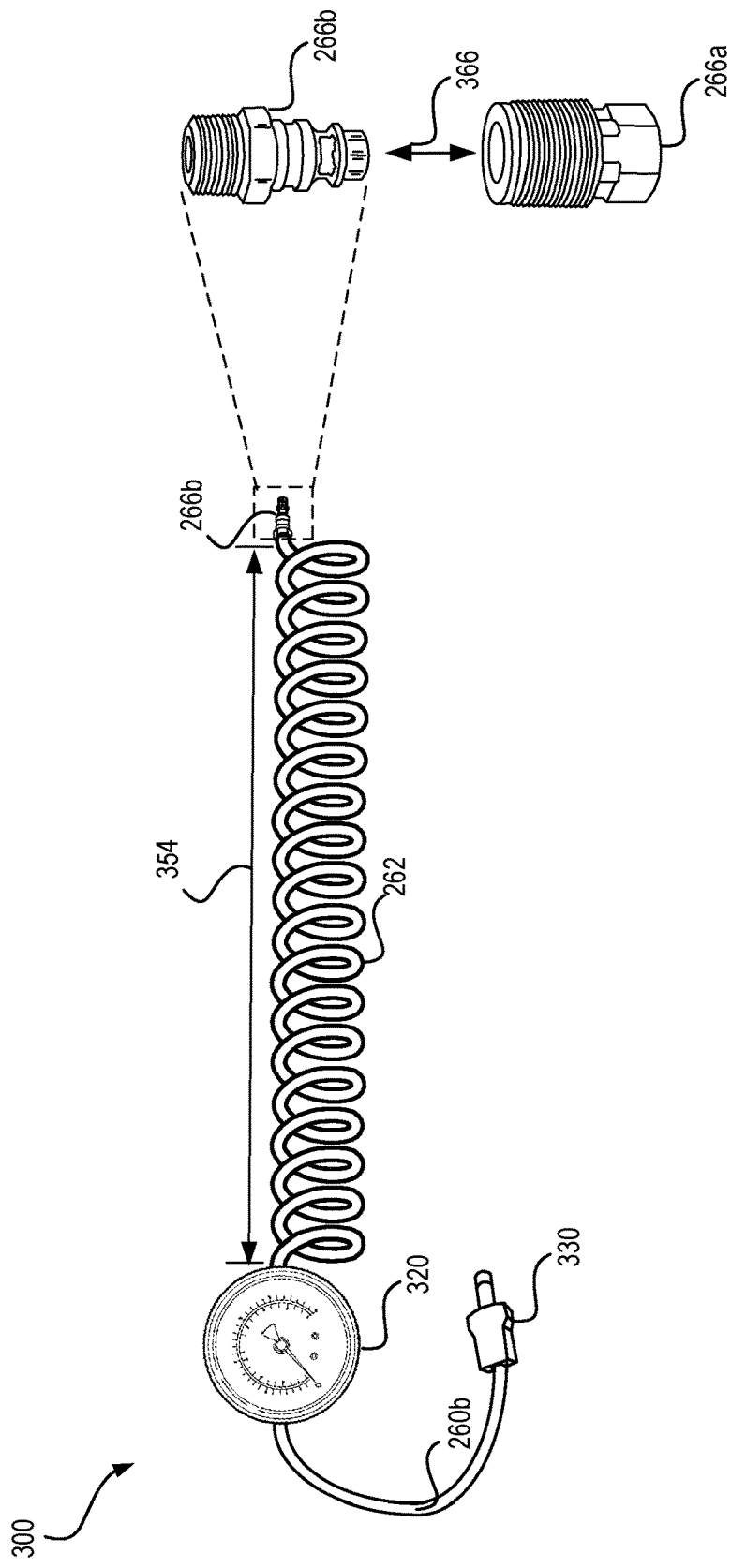
FIG. 3 shows a schematic of an example device for fluidly coupling the forced induction system of FIG. 2 to a depressurized object.

Turning now to FIG. 3, it illustrates a fluid coupling system 300 for fluidly coupling the discharge of the forced induction system 211 to a depressurized object 290, for example a vehicle tire 207. As illustrated in the non-limiting example of FIG. 3 the fluid coupling system may include a coiled flexible hose 262, extendable to longer lengths 354, to facilitate fluidic coupling, and coilable into a compact smaller form convenient for storage. In one example, the extended length 354 of the flexible hose 262 may be approximately 3 meters, corresponding to a length greater than a distance from the connection port 270 at the discharge of the forced induction system each tire 207 of the vehicle system. In the illustrative example of FIG. 3, connection port 270 may include a male or female portion of a pneumatic push-to quick-connect type fitting, corresponding to the first 266a or second components 266b, to facilitate rapid and easy fluidic coupling and fluidic decoupling (e.g., as indicated by double arrow 366) of the pick-up line 260 at the discharge of the forced induction system 211 without tools. As described above the push-to quick connect type couplings may include an integrated pick-up valve such that when the push-to quick-connect type fitting is decoupled, both male and female portions of the quick-connect type fitting seal, preventing boosted air leaking from the respective fitting portions. First component 266a may be fixed at the discharge of the forced induction system 211 to facilitate easy coupling and decoupling of the flexible hose 262 thereto without tools. Second end 260b of the flexible hose 262 may include a coupling 330 for fluidly coupling the second end 260b to the depressurized object. As one example, the coupling 330 may be compatible with a Schrader type valve commonly positioned at the end of a tire valve stem. Other types of couplings 330 may also be utilized such as Presta valve couplings, needle valve adaptors, and the like.

Fluid coupling system 300 may further include an in-line pressure regulator 420 for regulating the flow of boosted air from the discharge of the forced induction system 211 to the depressurized object. The in-line pressure regulator 420 may be an analog pressure regulator, as illustrated in FIG. 3, or may be a battery powered digital pressure regulator.

Turning now to FIG. 4, it illustrates an example human machine interface (HMI) screen 400 displayed at a display interface 113 for initiating pressurization of a depressurized object. The dashed arrows indicate progressive windows or drop-down menus that appear on the display interface 113, and originate by selecting various button icons within the HMI. Button icons may be selected, for example, by touching, or selecting with a peripheral device such as a mouse or other cursor tracking device. Selecting the Pressurization System ON switch 410 may activate the pressurization system. Activating the pressurization system presents the operator with various menus for selecting pressurization parameters such as the type depressurized object to be pressurized, the threshold pressure for pressurization, the rate of pressurization, and the like. After the pressurization system is switched ON, window 426 may appear, prompting the operator to confirm that the depressurized object has been fluidly coupled to the discharge of the forced induction system (FIS). The operator may manually fluidly couple the discharge of the FIS to the depressurized object using a fluid coupling system 300. The operator may select the YES button 428, indicating to the controller 12 that the FIS is fluidly coupled to the depressurized object. In other examples, sensors such as a pick-up valve sensor 59 may at least partially indicate to the controller 12 the coupling status of the depressurized object and the connecting port 270. To this end, the second end 260b of the flexible hose 262 may further include a sensor that may wirelessly transmit the coupling status of the second end 260b with the depressurized object to the controller 12.

After switching on the pressurization system, menu 420 may appear, allowing the operator to select the type of depressurized object to be pressurized. In the example of HMI screen 400, the operator may choose from a tire, ball, balloon, or other type of object. Selecting the type of object may bring up further windows 430, 440, and 450, allowing the operator to select the sub-type of object to be pressurized. For example, if a tire is to be pressurized, the operator may select from an auto tire, a truck tire, a bicycle tire, and the like. Selecting the sub-type of the object to be pressurized may allow for more precise customization of the pressurization parameters. For example, the operator may choose to inflate an auto tire to a nominal pressure (such as a factory-recommended inflation pressure), below nominal pressure, or above nominal pressure by way of a menu window 460. The nominal pressure may be preset and/or stored within memory on-board the controller 12 according to the type of tire, or may be manually entered by the operator; inflating below or above nominal pressure may allow for the operator to enter in a deviation amount below or above the nominal pressure, respectively. Alternately, inflating below or above nominal pressure may automatically set the pressurization of the tire to a threshold pressure deviating below or above the nominal pressure by a predetermined amount. For example, an operator may pressurize a vehicle tire by way of the pressurization system to a pressure less than a nominal tire pressure to increase ride comfort while operating the vehicle. Similarly, an operator may pressurize a vehicle tire by way of the pressurization system to a pressure greater than a nominal tire pressure to reduce fuel consumption while operating the vehicle. Furthermore, an operator may pressurize a soccer ball by way of the pressurization system to a pressure less than a nominal soccer ball pressure to reduce discomfort while playing soccer, or an operator may pressurize a soccer ball by way of the pressurization system to a pressure greater than a nominal soccer ball pressure to increase a speed and/or distance the soccer ball travels when kicked. As further described herein, the rate of pressurization may be based on a deviation between a current pressure of the depressurized object and the target threshold pressure; the larger the deviation, the faster the rate of pressurization. During pressurization of the depressurized object, the pressurization system, by way of the HMI interface screen 400, may further display visual illustrations as dynamic or static visual feedback to the operator of the object indicating the physical state of the object (e.g., overinflated, underinflated, and the like) as it is pressurized to the threshold pressure, as illustrated in FIG. 4.

As another example, pressurization of a ball may display a window 444 allowing for the operator to manually control the pressurization. A dial, or other control interface object, may be manually adjusted by way of the display interface 113 to supply boosted air to the depressurized ball at a low, medium or high rate (e.g., pressure). In this way, the pressurization may be executed in a more automatic, more manual, or partly both automatic and manual fashion, allowing for increased flexibility of operation, depending on the type of depressurized object to be pressurized. Additionally, a timer window 480 may be displayed indicating, during manual mode, an elapsed time during which pressurization is inactive while in manual mode. Inactivity of the pressurization system while in manual mode may be indicated by no flow of boosted air from discharge of forced induction system to depressurized object. Similarly, the inactivity of the pressurization system while in manual mode may be indicated by no input being received at the HMI screen 400 from an operator. Touching or sending of input to the HMI screen 400 may reset the timer. If the elapsed time reaches a threshold time, the controller 12 may automatically switch off the pressurization system in order to reduce power consumption. As shown in menu 420, further types of depressurized objects such as balloons and other objects may be pressurized by the pressurization system. In the example HMI screen, pressurizing a balloon may be directed by way of a menu window 450 whereby the operator may select a pressurization rate to a threshold pressure for balloon inflation.

The HMI screen 400 is an example HMI screen. In other example implementations, various combinations of the pressurization window interfaces may be applied to the various types of depressurized objects to be pressurized. For example, tires, balls, balloons, or other objects may be inflated to a nominal pressure, below a nominal pressure, or above a nominal pressure by way of automatic or manual control, and an operator may be able to select the pressurization rate by way of window menu 450. HMI screen 400 may further display a window 470 to switch the pressurization system off. As shown in FIG. 5, displaying pressurization system data at the display interface 113 may further include displaying data at a mobile device 550 (e.g., a cellular phone, tablet, laptop, electronic wrist watch, and the like) in wireless communication with the controller 12 and the pressurization system. As shown in the interface screen 550, the mobile device may utilize an app to display various dynamic data for monitoring the pressurization of the depressurized object such as the object being pressurized, the actual (current) pressure of the depressurized object, and the threshold (e.g., target) pressure. Similarly, displaying pressurization system data at the display interface 113 may further include displaying data at one or more interfaces on-board the vehicle such as an instrument panel 196 or a puddle lights 520 at one or more vehicle side mirrors 500. As illustrated by the magnified view of the display 520, the puddle lights may be repurposed to display the object being pressurized, the dynamic pressures of the depressurized object being pressurized, and the target threshold pressure. In a further example, the puddle lights may also display a state of charge of the energy storage system, including a threshold state of charge below which the pressurization system may be responsively switched off in order to maintain vehicle operability, as further discussed herein.

Turning now to FIG. 6, it illustrates an example plot 600 of discharge performance curves for various discharge rates for an energy storage device 150. In the example of FIG. 6, the discharge performance curves correspond to the discharge curves of a 12 V battery on-board a vehicle. As shown in FIG. 6, the shape of the discharge curves may exhibit a sharp decrease in voltage below a threshold voltage 620. Accordingly, below the threshold voltage 620, the energy storage device may be incapable of supplying enough voltage to reliably start a vehicle engine. In one example, the threshold voltage may be approximately 11.5 V. Relating to the pressurization system, because an energy storage device 150 on-board the vehicle may supply electrical power to the ebooster 213 for supplying boosted air, the controller 12 may stop supplying electrical power to the ebooster 213 and switch off the pressurization system during conditions when the state of charge of the energy storage device is below the threshold state of charge. Furthermore, the controller 12 may notify the operator by way of the display interface 113 and/or instrument panel 196 that the threshold state of charge has been reached and that the pressurization system has been switched off. In addition, the controller 12 may send a reminder to the operator to decouple the fluid coupling system 300 m from the discharge of the forced induction system 211.

Because electrically-driven compressors, including the ebooster 213, can draw higher amounts of power, the controller 12 may monitor the state of charge of an energy storage device 150 and determine if the state of charge is higher than a threshold state of charge for carrying out the pressurization. Determining if the state of charge is higher than the threshold state of charge can include determining if the state of charge is greater than the threshold state of charge by more than a threshold amount of charge. The threshold amount of charge may correspond to a calculated state of charge for supplying electrical power to the forced induction system 211 to increase a pressure of the depressurized object(s) to the threshold pressure, while maintaining a state of charge above the threshold state of charge. For example, in the case of a vehicle tire, the controller 12 may determine a current tire pressure from one or more tire pressure sensors 58, and then calculate the amount of electrical power (and charge) to inflate one or more tires from the current tire pressure(s) to the threshold pressure. As an example, the power drawn to pressurize four tires at pressures of 30 psi, 32 psi, 29 psi, and 25 psi to a nominal pressure of 35 psi may be computed by equation (6):

$$\text{Power draw}=[(35-30)+(35-32)+(35-29)+(35-25)]*k; \quad (6)$$

where k is a scaling factor converting a pressure difference in psi to a corresponding power per psi drawn for inflating the vehicle tires. The power draw computed from equation (6) may then be correlated to a discharge curve for an energy storage device (e.g., such as the discharge curves of FIG. 6) to determine if the ESD SOC is high enough to be maintained greater than the threshold SOC while pressurizing the target objects to the target threshold pressure.

If the anticipated power draw to pressurize the target object(s) is not predicted to discharge the ESD below the threshold SOC, then the controller may proceed with pressurization of the target object(s). For the case where the anticipated power draw to pressurize the target object(s) is predicted to discharge the ESD below the threshold SOC, then the controller may send an indication to the vehicle operator and may initiate charging of the ESD. Charging of the ESD may be performed by turning on the engine. In other examples, the operator may elect to charge the ESD by supplying electrical power thereto from another power source such as solar charging or another power source 180 external to the vehicle. Charging the ESD above the threshold SOC by the threshold amount of charge may then allow for the pressurization of the target object(s) to the threshold pressure. Alternately, in the case where multiple target objects are selected to be pressurized, a vehicle operator may elect to charge fewer target objects so that the threshold amount of charge greater than the threshold ESD SOC for pressurizing the target objects to the threshold pressure is reduced. Accordingly, charging of the ESD may be reduced or foregone prior to pressurizing g the target object(s). A generalized form of equation (6) may be represented by equation (7):

$$\Sigma_{i=1}^{n}(P_{tar,TH}-P_i)*k; \quad (7)$$

where i represents the $i^{th}$ target pressurized object, and n represents the number of target depressurized objects to be pressurized.

Turning now to FIGS. 7-8, an example methods 700 and 800 are shown for operating an electrically-driven forced induction system during engine off conditions to provide providing a reliable on-board source of compressed air for pressurizing depressurized objects. Instructions for carrying out routines 700 and 800, and the rest of the methods included herein may be executed by at least one of the controller 12, an operator input, and responsive to signals received from sensors of the vehicle system, such as the sensors described above with reference to FIGS. 1-2. The controller 12 may employ various actuators of the vehicle system to execute pressurization of the depressurized object, according to the methods described below.

At 702, the method begins with the controller 12 estimating and/or measuring engine operating conditions, such as engine status, key status, energy storage device state of charge (ESD SOC), tire pressure, and the like. Method 700 continues at 710 where the controller 12 determines the key on status and the engine on status. If either the key status is off (indicating that proper authorization and authentication is not available for operating the pressurization system) or the engine is on, method 700 ends. While the engine status is on, operation of the pressurization system may interfere with and reduce a reliability of the engine operation and vehicle drivability. If the engine status is off and the key status is on, then method 700 continues to 720. At 720, responsive to the key on status and the engine off status, the controller 12 the controller 12 may authenticate and authorize operation of the pressurization system, including displaying an HMI interface screen 400 at the display interface 113. The pressurization system may then be turned on automatically by the controller 12, or manually via by the operator. For example, the controller 12 may switch the pressurization system on and provide an indication of the pressurization system being on by backlighting a button icon switch 410 at HMI screen 400. Alternately, the operator may select the button icon switch 410 to turn the pressurization switch on at 720.

Next, at 730, the target (e.g., depressurized) object may be selected for pressurization. Selecting the target may be performed by the operator way of an HMI screen 400 displayed at the display interface 113. For example, the HMI screen 400 may receive operator input at one or more menu windows (e.g., windows 420, 430, 440, and 450) indicating the type and subtype of target object to be pressurized. In certain\n situations, more than one target object may be pressurized. For example, the controller 12 may determine that more than one vehicle tire pressure is less than the nominal tire pressure and may indicate to the vehicle operator that pressurization of the more than one vehicle tires is to be performed. In some examples, selecting the type and/or subtype of the target object to be pressurized may determine the target threshold pressure, $P_{tar,TH}$, to which the target depressurized object is to be pressurized. In some implementations, at 730, the controller 12 may prompt the operator to input a target threshold pressure. In this way the pressurization may be more flexible by allowing for pressurization of different objects of the same type to different threshold pressures. As described above, the target threshold pressure may correspond to a nominal pressure (e.g., a nominal tire pressure for a vehicle tire), below a nominal pressure, or above a nominal pressure. Furthermore, the threshold pressure may be adjusted prior to and/or during the pressurization of the depressurized object, according to equation (5), for temperatures deviating from standard ambient temperature.

Next, at 732, the controller 12 may determine if an ESD SOC is greater than a threshold SOC, $SOC_{TH}$, by a more than a threshold amount of charge. $SOC_{TH}$ may correspond to an ESD SOC below which a vehicle engine cannot be started, as determined from a discharge performance curve of the ESD. Accordingly, reducing ESD SOC below $SOC_{TH}$ can reduce vehicle operability and drivability. The threshold amount of charge may be computed, as described above with reference to equations (6) and (7) and the FIG. 6, given the number and type of target object(s) to be pressurized, their current pressure(s), and the threshold pressure to which they are to be pressurized. If the ESD SOC is not greater than $SOC_{TH}$ by more than the threshold amount of charge, then method 700 continues at 736 where the controller 12 initiates charging of the ESD. In one implementation, initiating charging of the ESD may include turning on the engine. In another example, charging the ESD may include the operator selecting to charge the ESD by way of turning on the engine, solar charging, coupling the ESD to an external power source 180, and the like. Furthermore, in some implementations, the controller 12 may indicate to the operator that the ESD SOC is not greater than $SOC_{TH}$ by more than the threshold amount of charge and may prompt the operator to determine a responsive course of action. In one case, the operator may decide to forego pressurization of the target object(s). In another case, the operator may decide to forego pressurization of one or more of the target object(s) to reduce the threshold amount of charge. In another case, the operator may decide to charge the ESD by way of one or more methods as described above. After 736, method 700 ends.

Returning to 732 for the case where ESD SOC–$SOC_{TH}$>threshold amount of charge, method 700 continues at 740 where pressurization of each target depressurized object is performed (as indicated by the method steps within the dashed lines). Pressurization of each target object begins at 746 where the discharge of the forced induction system is fluidly coupled to the target object. In the case where multiple target objects are to be pressurized the discharge of the forced induction system is fluidly coupled to one of the multiple target objects to be pressurized. Fluidly coupling the discharge of the FIS to the target object may include fluidly coupling one end of a fluid coupling system 300 to the discharge of the FIS, and fluidly coupling a second end of the fluid coupling system 300 to the target depressurized object, as described above with reference to FIGS. 2-3. Fluidly coupling the discharge of the FIS to the target object may include fluidly coupling the discharge of an ebooster 213 to the target object by way of a releasably coupleable push-to quick-connect connector. Releasably coupling the discharge of the FIS to the target depressurized object may be prompted by the controller 12 to the operator by way of an HMI screen 400, and confirmed by sensing from a pick-up valve sensor and by receiving operator input of the fluid coupling at the HMI screen 400. Following 746, method 700 continues at 750 where the controller 12 may adjust the engine intake throttle 20 to a more closed position, including fully closing the engine throttle 20, to reduce an amount of boosted air delivered from the discharge of the FIS to the induction manifold and to increase the amount of boosted air delivered to the target depressurized object fluidly coupled to the discharge of the FIS. After 750, method 700 continues at 760 where the controller 12 may adjust the FIS bypass valve 280 to a more closed position, including fully closing the FIS bypass valve 280, to increase an amount of intake air supplied to the electrically-driven ebooster 213 of the FIS.

Next, at 770, method 700 continues by the controller 12 supplying boosted air to the target depressurized object, as described with reference to method 800 of FIG. 8. Method 800 begins at 810 where the controller 12 determines if the pressurization is to be manually controlled. As described above with reference to FIG. 4, manual control may be operator-selected by way of a pressurization system HMI interface screen 400 displayed at a display interface 113 of the vehicle system 100. For example, manual control of the pressurization may be indicated by selecting one or more types or subtypes of depressurized objects to be pressurized, such as balls or balloons. In another example, manual control of the pressurization may be explicitly selected by the operator by way of the display interface 113. Manual control of the pressurization may include operator selection of the pressurization of the depressurized object to a nominal pressure, above the nominal pressure, or below the nominal pressure. Furthermore, the operator may manually control a rate of pressurization of the target depressurized object by manually regulating a rate of supply of boosted air to the depressurized object. Continuing at 820 for the case where manual pressurization mode is selected, controller 12 starts a timer to measure a time elapsed during manual mode when the pressurization is inactive. The pressurization system may be inactive when boosted air is not being actively supplied from the discharge of the FIS to the depressurized object, and/or when electrical power is not supplied to the FIS from the ESD.

Method 800 continues at 830 where the controller 12 may determine if electrical power is being supplied to the FIS from the ESD, indicating an active pressurization of the depressurized object. For the case where power is being supplied to the FIS from the ESD, method 800 continues at 840 where the timer is reset, and an indication of the active pressurization status is provided to the vehicle operator. Providing an indication of the active pressurization status may include displaying a dynamic pressure of the depressurized object to the operator by way of a display interface 113 on-board the vehicle or at a mobile device in wirelessly communication with the vehicle controller 12. Next, method 800 continues at 850 where the controller 12 determines if the ESD SOC is greater than the threshold SOC, $SOC_{TH}$. $SOC_{TH}$ may correspond to a SOC below which drivability and operability of the vehicle system may be reduced. In one example, $SOC_{TH}$ may correspond to approximately 11.5 V, below which starting reliability if the vehicle engine may be reduced. Responsive to ESD SOC being less than $SOC_{TH}$ at 850, method 800 returns to method 700 after 770, whereby the supply of boosted air to the target object is stopped. For the case where ESD SOC>$SOC_{TH}$ at 850, method 800 continues at 860, where the controller 12 determines if the internal pressure of the target object, $P_{tar}$, is less than a threshold pressure, $P_{tar,TH}$. $P_{tar,TH}$ may be predetermined according to a type and/or subtype of target depressurized object being pressurized. For example, pressurizing a vehicle tire may predetermine the $P_{tar,TH}$ to be equivalent to the nominal pressure of the tire, normalized to the actual ambient temperature. In other examples, $P_{tar,TH}$ may be operator-selected, and may correspond to a pressure above, below, or equivalent to a nominal pressure of the target depressurized object. For the case where $P_{tar}<P_{tar,TH}$, method 800 returns to 830, continuing manual pressurization of the target depressurized object. For the case where $P_{tar}$ is not less than $P_{tar,TH}$, method 800 continues to 866 where the controller 12 may send a notification to the operator by way of the display interface 113 and/or the instrument panel 196 indicating that the target threshold pressure has been reached. After 866, method 800 continues to 830, continuing manual control of the pressurization.

Returning to 830, for the case where supply of power to the FIS from the ESD is stopped, method 800 continues at 832. The operator may manually stop supply of power to the FIS from the ESD 150 for the case when $P_{tar}$ is raised to $P_{tar,TH}$. For example, the operator may manually stop supplying power to the FIS from the ESD after receiving notification from the controller at 866 that $P_{tar}$ is no longer less than $P_{tar,TH}$. Manually stopping supply of power to the FIS from the ESD may be executed by the operator by way of directing input to an HMI interface screen 400 of the pressurization system. For example, the operator may adjust a manual inflation control interface widget to 0 at an interface window 444. Alternately the operator may direct input at the HMI interface screen 400 to turn the pressurization system off, for example by way of a button icon switch 410. In another example, the operator may decide to momentarily pause the supply of electrical power to the FIS from the ESD to verify a firmness, shape, and or inflation volume of the target object, for example, if the operator is uncertain of a desired $P_{tar,TH}$. At 832, responsive to the manual stopping of the supply of electrical power to the FIS from the ESD, the controller 12 may increment the timer since the pressurization is inactive. At 834, the controller 12 determines if the timer is greater than a threshold time, $time_{TH}$. The threshold time may correspond to a time above which the pressurization system may be deactivated to reduce power consumption and to conserve ESD charge. In one example, the threshold time may be 1 minute or less. For the case where the timer value is not greater than $time_{TH}$, method 800 continues manual pressurization at 830. For the case where the timer value is greater than $time_{TH}$, method 800 continues at 836 where the timer value is reset, after which method 800 returns to method 700 after 770, whereby the pressurization of the target object is halted.

Returning to 810 for the case where manual pressurization mode is not selected (e.g., automatic control of the pressurization system) method 800 continues at 880 where the controller 12 determines if $P_{tar}$ is less than $P_{tar,TH}$. For the case where $P_{tar}<P_{tar,TH}$, method 800 continues at 882 where the controller 12 determines if ESD SOC>$SOC_{TH}$. $SOC_{TH}$ may correspond to a SOC below which drivability and operability of the vehicle system may be reduced. In one example, $SOC_{TH}$ may correspond to approximately 11.5 V, below which starting reliability if the vehicle engine may be reduced. Responsive to ESD SOC being less than $SOC_{TH}$ at 850, method 800 returns to method 700 after 770, whereby the supply of boosted air to the target object is stopped. For the case where ESD SOC>$SOC_{TH}$ at 850, method 800 continues at 886 where the controller 12 automatically supplies electric power from the ESD to the electrically-driven FIS, for example ebooster 213. Automatically supplying electric power from the ESD to the ebooster 213 includes supplying electrical power from the ESD to the ebooster without further operator input at the display interface 113. Next, at 888, the controller 12 provides the operator an indication of the pressurization status at display interface 113 and/or instrument panel 196. Providing the operator an indication of the pressurization status can include displaying a dynamic pressure of the target depressurized object, $P_{tar,TH}$, and other data relating to the pressurization of the target depressurized object. After 888, method 800 continues with the pressurization of the depressurized object, returning to method 800 at 880. Returning to 880, for the case where $P_{tar}$ is not less than $P_{tar,TH}$, indicating that the target depressurized object has been pressurized to the target pressure, method 800 returns to method 700 after 770.

Returning to method 700 after 770, method 700 continues at 780 responsive to a condition being satisfied indicating halting of the pressurization of the target object. The condition being satisfied indicating halting of the pressurization of the target object can include an ESD SOC decreasing below $SOC_{TH}$, a timer increasing above $time_{TH}$, the pressurization system being manually switched off by the operator, and/or $P_{tar}$ increasing above $P_{tar,TH}$ during automatic pressurization of the depressurized object. At 780, controller 12 returns the throttle 20 to a more open position, including fully opening the throttle 20, and adjusting the bypass valve 280 to a more open position, including fully opening the bypass valve 280. Alternately, in the case where additional target depressurized objects are to be pressurized, the controller 12 may maintain the throttle and bypass valve in a closed position until after each target depressurized object is pressurized or if the pressurization system is switched off by the operator or in response to a manual mode timer increasing above the threshold time. Next, at 782, controller 12 stops the supply of electric power to the FIS, and at 786, controller sends a notification to the operator by way of display interface 113 and/or instrument panel 196 indicating that the pressurization of the depressurized object has been stopped. Next, at 786, the target object may be fluidly decoupled from the discharge of the FIS, including fluidly decoupling the fluid coupling system 300 from the target object and the discharge of the FIS. At 786, the controller may further provide a message to prompt the operator to fluidly decouple the target object from the discharge of the FIS and to provide an operator input at the display interface as confirmation that the target object has been decoupled from the discharge of the FIS.

At 788, the controller 12 may determine if additional target objects are to be pressurized. For example, the controller 12 may automatically detect that one or more additional vehicle tires are depressurized below a threshold pressure. Alternately, the operator may have previously indicated by way of the HMI interface screen 400 that multiple target depressurized objects are to be pressurized. Furthermore, determining if additional target objects are to be pressurized at 788 may include prompting the operator to indicate if additional target objects are to be pressurized. For the case where additional target depressurized objects are to be pressurized, method 700 returns to 746 and continues pressurization of the next target object. For the case where there are no additional target depressurized objects to be pressurized, method 700 continues to 790 where the pressurization system is switched off. After 790, method 700 ends.

Turning now to FIG. 9, it illustrates an example timeline 900 showing operation of a vehicle system 100 according to the methods 700 and 800 for pressurizing a depressurized object during engine off conditions by supplying electrical power to a forced induction system of the engine system. The horizontal (x-axis) denotes time and the vertical markers t1-t10 identify times of events described herein for operation of the pressurization system. In reference to FIG. 9, plot 902 shows an engine on/off status and plot 904 shows a key on/off status over time. Plot 904 and plot 902 are slightly offset in timeline 900 for clarity. Plot 910 shows the pressurization system on/off status over time. Plot 920 shows the pressurization mode over time. Plot 930 shows the value of the manual pressurization mode timer over time as well as the threshold time value 936. Plot 940 shows the pressure of various target depressurized objects over time and their corresponding threshold pressure values 946. Plot 950 shows the fluidly coupled/decoupled status of the forced induction system discharge and the target depressurized object over time. Plot 960 shows the electrical power supplied to the forced induction system over time. Plot 970 shows the throttle position 970 and the bypass valve position 972 over time. Plot 980 shows the energy storage device (ESD) state of charge (SOC) 980 over time, and the threshold SOC 986. Plot 990 shows the operation indication status 990 over time.

Prior to time t1, the vehicle system is in operation with the engine on and key on. As such, the pressurization system is off, and the discharge of the FIS is fluidly decoupled from any target depressurized objects. Because the vehicle is in operation with the engine on, the throttle is adjusted to a more open position to allow for intake and boosted air to enter the induction manifold 22 for supporting combustion in the engine cylinders 30. Furthermore, the bypass valve 280 is adjusted to a more open position so that intake air bypasses the ebooster 213 since the engine turbocharger is spooled up and the engine system is not operating in a turbo lag condition. Because the ebooster 213 is off, the power supplied to the FIS is lower. Prior to time t1, the ESD SOC is higher since the engine is on, thereby charging and sustaining the ESD capacity.

At time t1, the vehicle is parked and the engine and key status are both switched off. While the engine status and the key status are off, the vehicle operator is able to switch the pressurization system on, for example, by way of an HMI interface screen 400 displayed at the display interface 113. At time t1, a type and/or subtype of target depressurized object to be pressurized be manually selected by the vehicle operator or automatically by the controller 12. At time t1, the pressurization system is in automatic mode and the controller 12 determines by way of individual tire pressure sensors 58 that two of the vehicle tires are below the nominal pressure (e.g., threshold pressure). Based on the relationships shown in equations (6) and (7), the controller 12 may calculate a threshold amount of charge that would be supplied to the FIS to pressurize the two tires from their current pressures to their threshold pressures. The calculated threshold amount of charge is represented by the double arrow 982 in timeline 900. Because the current ESD SOC is greater than the threshold ESD SOC 986 by more than the threshold amount of charge 982 for inflating the two tires to their threshold pressures, controller 12 momentarily sends the operator a notification at t1 indicating that two tires have pressures below their nominal pressures and that the ESD SOC is sufficient to pressurize the two tires to their threshold pressures. The controller 12 may then prompt the vehicle operator to fluidly couple the discharge of the FIS to the first target depressurized tire, for example, by way of a fluid coupling system 300. Fluid coupling system 300 may include a first end 266b and a second end 260b that may be releasably coupleable to the discharge of the FIS and the first target depressurized tire, respectively. In some examples, the controller 12 may sense the fluid coupling of the FIS and the target depressurized object by way of one or more pick-up valve sensors 59 positioned at the connection port 270 and/or the fluid coupling system 300. Responsive to fluidly coupling the FIS discharge and the target depressurized object, the pressurization of the two tires proceeds automatically, the controller 12, first adjusting the throttle and bypass valves to more closed positions (including fully closing the throttle and bypass valves), and then supplying electrical power to the FIS to supply boosted air to the first target depressurized tire.

Between times t1 and t2, the pressure 940 of the first depressurized tire monotonically increases towards the threshold pressure 946, and correspondingly, the ESD SOC begins to decrease monotonically as it supplies electrical power to the FIS to support the pressurization of the first target depressurized tire. During pressurization, the deviation in the tire pressure of the first target depressurized tire from the threshold pressure continuously decreases, and the controller 12 responsively lowers the power supplied to the FIS to gradually reduce a pressurization rate so as to reduce a risk of overinflating the tire. Furthermore, the controller 12 may display the dynamic pressure of the pressurizing tire at a display interface 113 on-board the vehicle or at a mobile device in wireless communication with the controller 12 so that the operator can monitor the tire pressure during pressurization of the first target depressurized tire. Because the pressurization system is being operated automatically by the controller 12, the timer value remains at 0 and does not increase. At time t2, the pressure of the first target depressurized tire reaches the threshold pressure and the controller 12 responsively stops the supply of electrical power to the FIS, thereby halting the reduction of ESD SOC. Having pressurized the first depressurized tire to the nominal threshold pressure, the controller 12 sends the vehicle operator a message indicating that the first tire has been pressurized to the nominal threshold pressure. Furthermore, at t2, responsive to pressurizing the first depressurized tire to the threshold pressure, the controller 12 may return the throttle to the more open position (including fully opening the throttle) and may return the bypass valve to the more open position (including fully opening the bypass valve). Alternately, in some implementations, since multiple depressurized tires are to be pressurized and there remains the second depressurized tire to be pressurized, the controller 12 may maintain the bypass valve and the throttle in the more closed positions (including fully closing both the throttle and the bypass valve). At time t2, the controller 12 may further notify the vehicle operator to fluidly decouple the first tire from the discharge of the FIS and to couple the second tire to the discharge of the FIS.

At time t3, in response to fluidly coupling of the second target depressurized tire with the discharge of the FIS, the controller 12 begins supplying electrical power to the FIS to supply boosted air to the second depressurized tire. Because the deviation between the second depressurized tire and the threshold pressure at time t3 is larger than the deviation between the pressure of the first depressurized tire and the threshold pressure at time t1, the controller 12 may supply a higher amount of electrical power to the FIS at t3 to pressurize the second depressurized tire than the amount of electrical power supplied to the FIS at time t1 to pressurize the first depressurized tire. As the pressure of the second depressurized tire increases, the controller 12 may responsively reduce the electrical power supplied to the FIS, so as to reduce a risk of overinflating the second depressurized tire. Between time t2 and time t3, the ESD SOC decreases monotonically, but remains above $SOC_{TH}$ as the ESD supplies electrical power to pressurize the second depressurized tire. During pressurization of the second depressurized tire, the controller 12 may display the dynamic pressure of the second pressurized tire at the display interface 113 on-board the vehicle system 100 or at a mobile device in wireless communication with the controller 12. At time t4, the pressure of the second depressurized tire is raised to the threshold pressure, and in response, the controller stops supplying electrical power to the FIS from the ESD. Furthermore, the controller 12 sends a notification to the vehicle operator that the pressure of the second depressurized tire has been raised to the threshold pressure. Furthermore, at t4, responsive to pressurizing the second depressurized tire to the threshold pressure, the controller 12 may return the throttle to the more open position (including fully opening the throttle) and may return the bypass valve to the more open position (including fully opening the bypass valve). Alternately, in some implementations, since multiple depressurized tires are to be pressurized and there remains the second depressurized tire to be pressurized, the controller 12 may maintain the bypass valve and the throttle in the more closed positions (including fully closing both the throttle and the bypass valve). The controller 12 may further notify the operator to fluidly decouple the second depressurized tire from the discharge of the FIS.

Following pressurization of the second depressurized tire, between time t4 and time t5, the controller 12 receives operator input by way of an HMI interface screen 400 at the display interface 113 from the vehicle operator for the pressurization system to pressurize an additional depressurized object such as a basketball in manual mode. Responsive to the operator request, at time t5, the controller 12 switches the pressurization system to manual mode, and adjusts the throttle and the bypass valve to a more closed position (including fully closed), and the operator fluidly couples the depressurized basketball to the discharge of the FIS with a fluid coupling system 300. Since the pressurization system is in manual mode the controller 12 does not automatically begin supplying electrical power to the FIS. Instead, the operator, for example by way of HMI interface screen 400 at the display interface, manually controls the supply of electrical power to the FIS. In the case of the HMI interface screen 400, the operator may adjust a knob widget at a menu window 444 to increase and/or decrease an amount of electrical power supplied to the FIS in order to increase and/or decrease a supply of boosted air pressure to the depressurized basketball. Because the basketball is smaller in volume as compared to a vehicle tire and because the threshold pressure is lower, the vehicle operator may direct a lower amount of electrical power to the pressurize the depressurized basketball. Furthermore, as the pressure of the depressurized basketball approaches the threshold pressure, the vehicle operator may reduce a power supplied to the FIS to decrease the rate of boosted air supplied to the depressurized basketball so as to lower a risk of overinflating the depressurized basketball. Further still, during pressurization of the depressurized basketball, the dynamic pressure, threshold pressure, and other pressurization data may be displayed at a display interface 113 on-board the vehicle or at a mobile device in wireless communication with the controller 12. Additionally, during the pressurization of the depressurized the ESD SOC decreases continuously but remains above $SOC_{TH}$.

At time t6, the pressure of the depressurized tire increases beyond the threshold pressure and in response, the operator stops supply of electrical power to the FIS. Further in response to the pressure of the depressurized tire increasing beyond the threshold pressure at time t6, the controller 12 adjusts the throttle and bypass valve to a more open position (including fully open). Because the pressurization system is in manual mode, the controller 12 begins incrementing the timer responsively to the pressurization system being on, in manual mode, and being inactive (e.g., no electrical power being supplied from the FIS). Because the pressurization system remains inactive in manual mode, the controller 12 repeatedly increments the timer value until $time_{TH}$ is reached at time t7. Responsive to the timer value being greater than $time_{TH}$, controller 12 switches off the pressurization system to reduce power consumption.

Next, at time t8, the controller 12 receives input from the vehicle operator by way of HMI interface screen 400 of the display interface 113 to switch on the pressurization system, and to pressurize a depressurized bicycle tire in automatic mode to a threshold pressure. Responsive to the pressurization system being switched on, and the depressurized bicycle tire being selected as the target depressurized object, the controller 12 determines if the ESD SOC is above $SOC_{TH}$ by more than the threshold amount of charge 984. In response to determining that the ESD SOC is not greater than $SOC_{TH}$ by more than the threshold amount of charge at time t8, the controller 12 begins charging the ESD by switching on the engine, and responsive to the engine turning on, the pressurization system is switched off, and the throttle and bypass valves remain opened to allow increased intake air to be supplied to the induction manifold 22. In other examples, the controller 12 may charge the ESD responsive to the ESD SOC being greater than the $SOC_{TH}$ by less than the threshold amount of charge by way of other methods such as connecting an power source external to the vehicle system to charge the ESD, such as plugging in a plug-in hybrid electric vehicle to an external power source. In the cases where the ESD is charged without turning on the engine, the pressurization system may remain on while the ESD is charged. Additionally, at time t8, the controller 12 sends a notification to the vehicle operator that the ESD SOC is greater than the $SOC_{TH}$ by less than the threshold amount of charge and that ESD charging has been initiated to raise the ESD SOC.

At time t9, the ESD SOC rises above the $SOC_{TH}$ by more than the threshold amount of charge, and in response, the controller switches off the engine to stop charging the ESD, and switches on the pressurization system. Furthermore, the vehicle operator may be notified by the controller 12 that the ESD SOC has been charged to a sufficient level to pressurize the target depressurized object, and consequently switches on the pressurization system and directs input by way of the display interface 113 to pressurize the depressurized bicycle tire in automatic mode. Because the ESD SOC has been charged above the $SOC_{TH}$ by more than the threshold amount, the controller 12 prompts the vehicle operator to fluidly couple the depressurized bicycle tire to the FIS. In response to fluidly coupling the depressurized bicycle tire to the FIS at t9, the controller 12 closes the throttle and the bypass valve. Since the pressure of the depressurized bicycle tire is less than $P_{tar,TH}$ and ESD SOC>$SOC_{TH}$, the controller 12 begins to supply electrical power to the FIS from the ESD to supply boosted air to the depressurized bicycle tire. During pressurization of the depressurized bicycle tire, the controller 12 displays pressurization data by way of the display interface 113.

Because the threshold pressure and the deviation in pressure between the threshold pressure and the pressure of the depressurized bicycle tire at t9 is higher as compared to the threshold pressure and the deviation in pressure between the threshold pressure and the pressure of the depressurized basketball at time t5, the amount of electrical power supplied to the FIS (and consequent amount of boosted air supplied to the target depressurized object) may be higher at t9 than at t5. During pressurization of the depressurized bicycle tire, pressurization data may be displayed by the controller 12 at the display interface 113 on-board the vehicle or at a mobile device wirelessly communicating with the controller 12. Furthermore, as electrical power is supplied to the FIS, the pressure of the bicycle tire is raised, and the ESD SOC decreases monotonically. At time t10, the pressure of the depressurized bicycle tire reaches $P_{tar,TH}$, and in response, the controller 12 stops supplying electrical power to the FIS, switches the pressurization system off, and adjusts the throttle and bypass valve to a more open position (including fully open). Furthermore, the controller 12 send an indication to the vehicle operator by way of display interface 113 and/or instrument panel 196 that the depressurized bicycle tire has been pressurized to $P_{tar,TH}$, and prompts the vehicle user to fluidly decouple the bicycle tire from the FIS. In some implementations, when the fluid coupling system 300 and/or a depressurized target object is fluidly coupled to the FIS at the connection port 270, the controller may disallow a vehicle system engine to be switched on. Furthermore, attempting to switch on the vehicle engine while the fluid coupling system 300 and/or a depressurized target object is fluidly coupled to the FIS at the connection port 270 may prompt the controller 12 to send a notification to the vehicle operator to fluidly decouple the fluid coupling system 300 and/or a depressurized target object from the FIS at the connection port 270.

In this way, an existing forced induction system of a vehicle system may be advantageously repurposed as a source of compressed air or a pressurization system for pressurizing various depressurized objects, including depressurized tires and other objects as described herein, while the engine is off. Furthermore, the methods and systems described herein preclude dedicated air pumps for tire inflation and/or pressure vessels for storing compressed air utilized by conventional tire inflation methods and emergency kits, thereby reducing cost and component complexity of the vehicle system while achieving a simple, low-cost, and reliable solution for inflating tires and other depressurized objects. Further still, weight of the vehicle system can be reduced while preserving cargo space since additional components such as pumps and pressure vessels are avoided. Further still, the technical effect of performing the pressurization of the depressurized object while the engine is off is that vehicle emissions and fuel consumption may be reduced, while maintaining vehicle performance. Further still, by repurposing an electrically-driven forced induction system fluidly coupled to the engine air intake the on-time duty cycle of the electrically-driven forced induction system can be increased. Further still, the electrically-driven forced induction system may be automatically or manually controlled to pressurize depressurized objects, thereby increasing flexibility of the pressurization relative to conventional systems and methods by allowing for operator-directed pressurization rates and operator-selected pressurization target pressures.

An example method for pressurizing a depressurized object with an engine of a vehicle system may comprise: in response to a pressure of the depressurized object being below a threshold pressure while the engine is off, fluidly coupling a discharge of a forced induction system to the depressurized object, wherein the engine includes the forced induction system, and pressurizing the depressurized object by supplying electrical power to the forced induction system. In the preceding example, additionally or optionally, supplying electrical power to the forced induction system may include supplying electrical power from a battery of the vehicle system. In any or all of the preceding examples, additionally or optionally, the method may further comprise stopping the supplying of electrical power to the forced induction system responsive to a state of charge of a battery on board the vehicle system decreasing below a threshold state of charge. In any or all of the preceding examples, additionally or optionally, the method may further comprise stopping supply of electrical power to the forced induction system responsive to the pressure of the depressurized object increasing above the threshold pressure. In any or all of the preceding examples, additionally or optionally, the method may further comprise fluidly decoupling the discharge of the forced induction system to the depressurized object responsive to the pressure of the depressurized object increasing above the threshold pressure. In any or all of the preceding examples, additionally or optionally, the threshold pressure may include an operator-input threshold pressure. In any or all of the preceding examples, additionally or optionally, pressurizing the depressurized object by supplying electrical power to the forced induction system may include supplying higher electrical power to the forced induction system when the threshold pressure is higher and supplying lower electrical power to the forced induction system when the threshold power is lower. In any or all of the preceding examples, additionally or optionally, pressurizing the depressurized object by supplying electrical power to the forced induction system may include supplying higher electrical power to the forced induction system when a difference between the pressure of the depressurized object and the threshold pressure is higher and supplying lower electrical power to the forced induction system when the difference between the pressure of the depressurized object and the threshold power is lower.

In another example, a method for a vehicle system including an engine and a forced induction system coupled to an intake passage of the engine, may comprise: during a first condition including an engine off state, fluidly coupling a discharge of the forced induction system to a depressurized object, and inflating the depressurized object by supplying electrical power to the forced induction system. Additionally or optionally to the preceding example, the first condition may further comprise a key on engine off state. In any or all of the preceding examples, additionally or optionally, the vehicle system may further include a throttle positioned in the intake passage fluidly downstream of the discharge, and the first condition may further include when the throttle is closed. In any or all of the preceding examples, additionally or optionally, the vehicle system may further include a bypass valve for directing intake air to fluidly bypass the forced induction system when the bypass valve is opened, and the first condition may further include when the bypass valve is closed. In any or all of the preceding examples, additionally or optionally, supplying electrical power to the forced induction system may include supplying electrical power to the forced induction system from a battery on board the vehicle system. In any or all of the preceding examples, additionally or optionally, the first condition may further include when a pressure of the depressurized object is below a threshold pressure, and inflating the depressurized object may include pressurizing the depressurized object to the threshold pressure. In any or all of the preceding examples, additionally or optionally, the first condition may further include when the state of charge of the battery is above a threshold state of charge by more than a threshold amount of charge, wherein the threshold amount of charge supplies the electrical power to the forced induction system from the battery for pressurizing the depressurized object to the threshold pressure.

An example vehicle system may comprise: an engine; a forced induction system coupled to an intake air passage of the engine; and a controller storing instructions in memory, executable to, during a first condition including an engine off state, fluidly couple a discharge of the forced induction system to a depressurized object, and pressurize the depressurized object by supplying electrical power to the forced induction system. In the preceding example, additionally or optionally, the vehicle system may further comprise a pressure regulator fluidly coupled inline between the discharge of the forced induction system and the depressurized object. In any or all of the preceding examples, additionally or optionally, the executable instructions to pressurize the depressurized object may comprise raising a pressure of the depressurized object responsive to a pressure of the depressurized object being below a threshold pressure. In any or all of the preceding examples, additionally or optionally, the vehicle system may further comprise a drivetrain with a tire, wherein the depressurized object includes the tire. In any or all of the preceding examples, additionally or optionally, the forced induction system may include an electrically-driven air compressor fluidly coupled to the intake air passage of the engine.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for pressurizing a depressurized object with an engine of a vehicle system, comprising:
in response to a pressure of the depressurized object being below a threshold pressure while the engine is off and an anticipated power draw from a battery to pressurize the depressurized object being predicted to not discharge the battery below a threshold state of charge (SOC),
fluidly coupling a discharge of a forced induction system of the engine to the depressurized object, and
pressurizing the depressurized object by supplying electrical power to the forced induction system via the battery.

2. The method of claim 1, further comprising stopping the supplying of electrical power to the forced induction system responsive to the SOC of the battery on board the vehicle system decreasing below the threshold SOC.

3. The method of claim 2, further comprising stopping the supply of electrical power to the forced induction system responsive to the pressure of the depressurized object increasing above the threshold pressure.

4. The method of claim 1, further comprising fluidly decoupling the discharge of the forced induction system to the depressurized object responsive to the pressure of the depressurized object increasing above the threshold pressure.

5. The method of claim 1, wherein the threshold pressure includes an operator-input threshold pressure.

6. The method of claim 1, wherein pressurizing the depressurized object by supplying electrical power to the forced induction system includes supplying higher electrical power to the forced induction system when the threshold pressure is higher and supplying lower electrical power to the forced induction system when the threshold pressure is lower.

7. The method of claim 1, wherein pressurizing the depressurized object by supplying electrical power to the forced induction system includes supplying higher electrical power to the forced induction system when a difference between the pressure of the depressurized object and the threshold pressure is higher and supplying lower electrical power to the forced induction system when the difference between the pressure of the depressurized object and the threshold pressure is lower.

8. A method for a vehicle system including an engine and a forced induction system coupled to an intake passage of the engine, the method comprising:
responsive to a first condition including an engine off state, a pressure of a depressurized object being below a threshold pressure while the engine is in the engine off state, and an anticipated power draw from a battery to pressurize the depressurized object being predicted to not discharge the battery below a threshold state of charge (SOC),
fluidly coupling a discharge of the forced induction system to the depressurized object,
inflating the depressurized object by supplying electrical power to the forced induction system, and
displaying pressurization system data at a display interface, including a pressurization of the depressurized object as the depressurized object is being inflated, wherein the display interface is an interface screen of a mobile device.

9. The method of claim 8, wherein the depressurized object includes an air suspension system of the vehicle system.

10. The method of claim 8, wherein the vehicle system further includes a throttle positioned in the intake passage fluidly downstream of the discharge of the forced induction system, and the first condition further includes when the throttle is closed.

11. The method of claim 10, wherein the vehicle system further includes a bypass valve for directing intake air to fluidly bypass the forced induction system when the bypass valve is opened, and wherein the first condition further includes when the bypass valve is closed.

12. The method of claim 11, wherein supplying electrical power to the forced induction system includes supplying electrical power to the forced induction system from the battery on board the vehicle system.

13. The method of claim 12, wherein inflating the depressurized object includes pressurizing the depressurized object to the threshold pressure.

14. The method of claim 13, wherein the first condition further includes when the SOC of the battery is above the threshold SOC by more than a threshold amount of charge.

15. A vehicle system, comprising:
an engine;
a forced induction system coupled to an intake air passage of the engine;
puddle lights positioned at one or more side mirrors of the vehicle system; and
a controller storing instructions in memory, executable to:
responsive to a first condition including an engine off state a pressure of a depressurized object being below a threshold pressure while the engine is in the engine off state, and an anticipated power draw from a battery to pressurize the depressurized object being predicted to not discharge the battery below a threshold state of charge (SOC),
fluidly coupling a discharge of the forced induction system to the depressurized object, where the depressurized object is external to the engine,
pressurizing the depressurized object by supplying electrical power to the forced induction system, and
displaying pressurization system data via the puddle lights.

16. The vehicle system of claim 15, further comprising a pressure regulator fluidly coupled inline between the discharge of the forced induction system and the depressurized object.

17. The vehicle system of claim 16, wherein the executable instructions to pressurize the depressurized object comprise raising the pressure of the depressurized object.

18. The vehicle system of claim 17, further comprising a drivetrain with a tire, wherein the depressurized object includes the tire.

19. The vehicle system of claim 15, wherein the depressurized object is external to the vehicle system and coupled to the forced induction system via a pick-up line.

* * * * *